(12) United States Patent
Zalewski et al.

(10) Patent No.: US 8,165,767 B2
(45) Date of Patent: Apr. 24, 2012

(54) TRACTION CONTROL SYSTEM FOR 4WD/AWD VEHICLES

(75) Inventors: John D. Zalewski, Liverpool, NY (US); Charles Fairbanks, Liverpool, NY (US); Gunter Niederbacher, Clarkston, MI (US)

(73) Assignee: MAGNA Powertrain USA, Inc., Troy, MI (US)

( * ) Notice: Subject to any disclaimer, the term of this patent is extended or adjusted under 35 U.S.C. 154(b) by 557 days.

(21) Appl. No.: 12/439,002

(22) PCT Filed: Aug. 17, 2007

(86) PCT No.: PCT/US2007/018325
§ 371 (c)(1),
(2), (4) Date: Feb. 26, 2009

(87) PCT Pub. No.: WO2008/027224
PCT Pub. Date: Mar. 6, 2008

(65) Prior Publication Data
US 2010/0017083 A1 Jan. 21, 2010

(51) Int. Cl.
*G06F 19/00* (2006.01)
(52) U.S. Cl. ....................................................... 701/69
(58) Field of Classification Search ............... 701/69; 280/418; 303/143, 190; 180/233
See application file for complete search history.

(56) References Cited

U.S. PATENT DOCUMENTS

| | | | |
|---|---|---|---|
| 4,669,569 A | 6/1987 | Suzuki | |
| 4,702,341 A | 10/1987 | Taga et al. | |
| 6,039,138 A | 3/2000 | Sugimoto et al. | |
| 6,094,614 A | 7/2000 | Hiwatashi | |
| 6,567,116 B1 * | 5/2003 | Aman et al. | 348/169 |
| 2006/0231315 A1 | 10/2006 | Homan et al. | |
| 2010/0256874 A1 * | 10/2010 | Carresj et al. | 701/48 |

FOREIGN PATENT DOCUMENTS

| | | |
|---|---|---|
| EP | 0352994 A | 1/1990 |
| EP | 1462292 A | 9/2004 |
| EP | 1495904 A | 1/2005 |

* cited by examiner

*Primary Examiner* — Yonel Beaulieu
(74) *Attorney, Agent, or Firm* — Harness, Dickey & Pierce, P.L.C.

(57) ABSTRACT

A method controls a powertrain that directs power from an engine and a transmission to all four wheels or to just front wheels or to just rear wheels. The method includes monitoring information transmitted over a communications network. The method determines whether one or more components of the powertrain are in an active condition or in an inactive condition. The one or more components of the powertrain are in the inactive condition when not connected to the transmission and not connected to the front wheels or the rear wheels. The one or more components of the powertrain are in the active condition when connected to the transmission and connected to the front wheels and the rear wheels. The method switches the one or more components of the powertrain between the inactive condition and the active condition based only on the information from the communications network and without intervention from a user.

20 Claims, 16 Drawing Sheets

TRACTION CONTROL SYSTEM FOR 4WD/AWD VEHICLES

FIELD

The present teachings relate to a vehicle traction control system and more specifically relate to automatically switching powertrain components of a four wheel drive or an all wheel drive powertrain between an active condition and an inactive condition based on one or more ambient conditions, road conditions and/or changes to vehicle systems.

BACKGROUND

Typically, all wheel drive and four wheel drive vehicles are equipped with a transfer case mounted to a multi-speed transmission for directing power from an engine to all four wheels. To accommodate different road surfaces and traction conditions, some transfer cases are equipped with a mode and range shift mechanism. As shown in FIG. 1, a user 1 typically must interface with a drive selector 2 to control the mode and range shift mechanism that couples or uncouples the part time driven wheels to the driven wheels. The user 1 therefore, must manually choose between a two wheel drive mode 3, a four wheel drive mode 4 and an all wheel drive mode 5.

In the above example, the user 1 is required to manipulate the drive selector 2 to engage or disengage powertrain components to switch between the four wheel, the all wheel drive and the two wheel drive modes. The transient nature of road and ambient conditions, however, may preclude manual manipulation of the drive selector 2. In other instances, the vehicle may be in the all wheel or the four wheel drive modes when the two wheel drive mode is more suitable. While the various systems remain useful for their intended purposes, there remains room in the art for improvement.

SUMMARY

The present teachings generally include a method for controlling a powertrain that directs power from an engine and a transmission to all four wheels or to just front wheels or to just rear wheels. The method includes monitoring information transmitted over a communications network. The method determines whether one or more components of the powertrain are in an active condition or in an inactive condition. The one or more components of the powertrain are in the inactive condition when the one or more components are not connected to the transmission and are not connected to the front wheels or the rear wheels. The one or more components of the powertrain are in the active condition when the one or more components are connected to the transmission and are connected to the front wheels and the rear wheels. The method switches the one or more components of the powertrain between the inactive condition and the active condition based only on the information from the communications network and without intervention from a user.

Further areas of applicability of the present teachings will become apparent from the description provided herein. It should be understood that the description and specific examples are intended for purposes of illustration only and are not intended to limit the scope of the present teachings.

BRIEF DESCRIPTION OF THE DRAWINGS

The drawings described herein are for illustration purposes only and are not intended to limit the scope of the present teachings.

DETAILED DESCRIPTION

Figure 1:
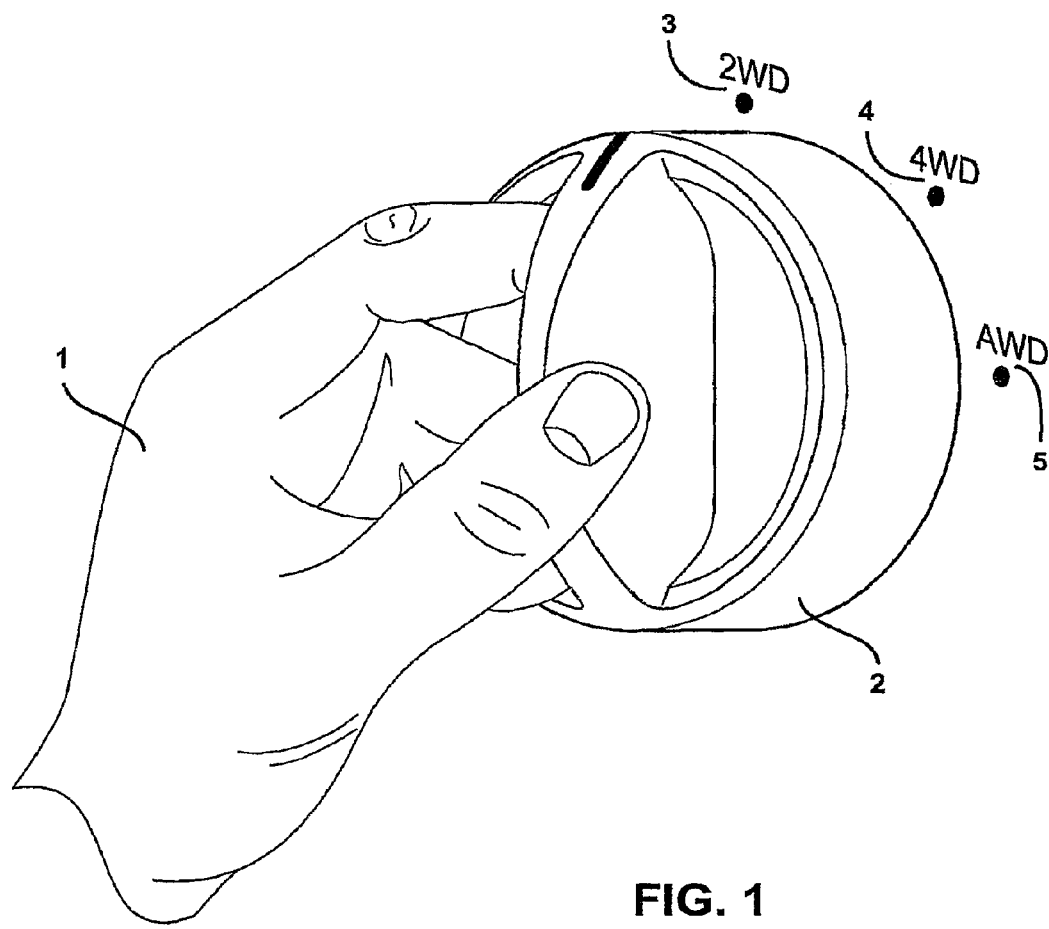
FIG. 1 is prior art partial perspective view of a mode shift mechanism having a drive selector for selecting between a two wheel drive mode, a four wheel drive mode and an all wheel drive mode.

The following description is merely exemplary in nature and is not intended to limit the present teachings, their application, or uses. It should be understood that throughout the drawings, corresponding reference numerals can indicate like or corresponding parts and features.

Figure 2:
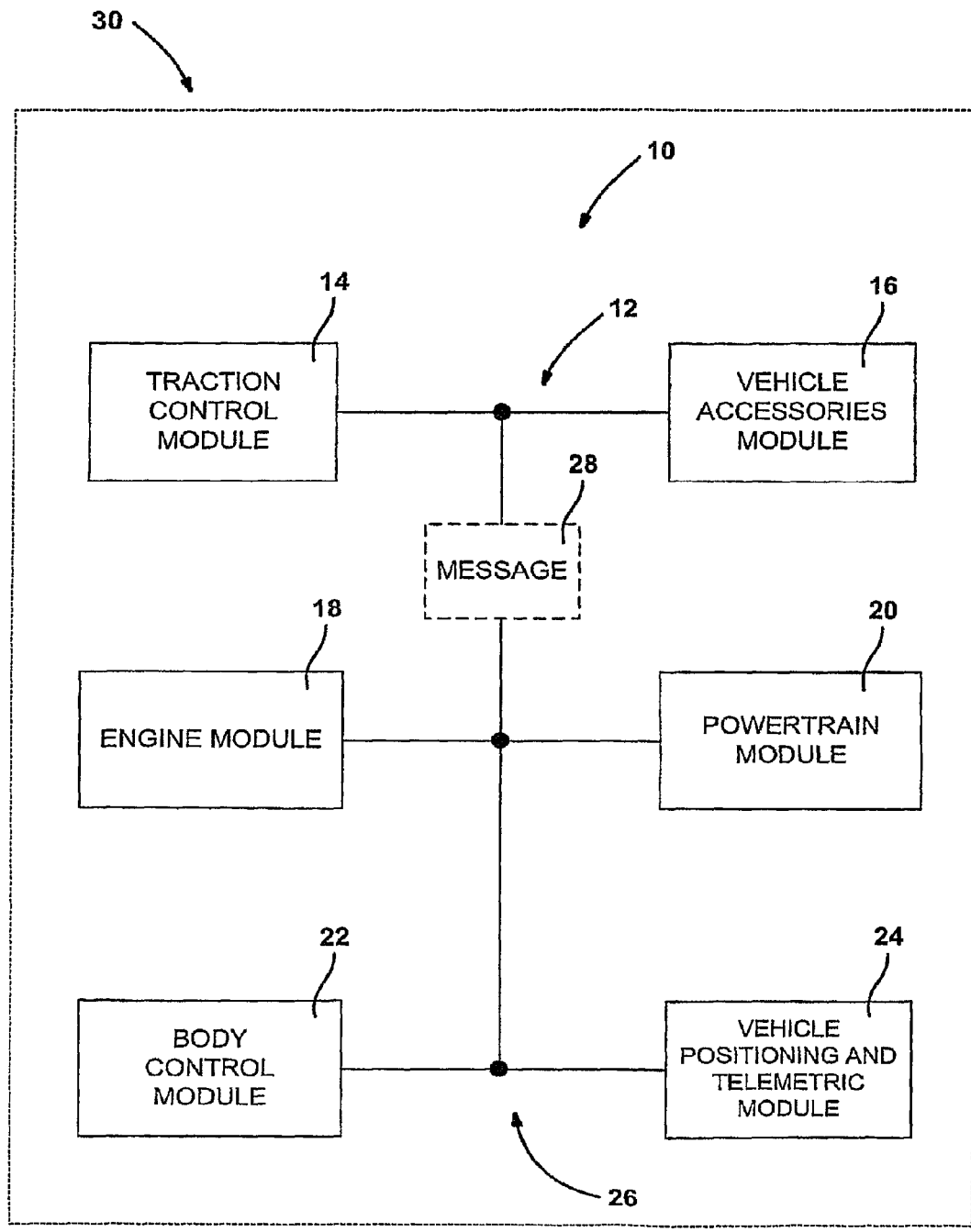
FIG. 2 is a diagram of a traction control system for a vehicle in accordance with the present teachings showing a traction control module communicating with other modules over a communications network.

With reference to FIG. 2, the present teachings can generally include a traction control system 10 that can determine whether to uncouple or couple, thus switch between an inactive or an active condition, one or more powertrain components based on ambient conditions, road conditions and/or changes to one or more vehicle systems. In this regard, the traction control system 10 can uncouple the powertrain components and place the components in an inactive condition. The inactive condition can be a condition in which one or more powertrain components is not transmitting rotary power. In the inactive condition, power consumption of the powertrain can be reduced. On the other hand, the traction control system 10 can re-couple and engage the components placing the powertrain components in an active condition. The active condition can be a condition in which one or more powertrain components is transmitting rotary power. The one or more powertrain components can transmit rotary power from an input to an output and the rotary can be received from the engine or from the wheels when rolling. The traction control system 10 can automatically switch the one or more powertrain components into the active condition or the inactive condition automatically without intervention from a user.

The traction control system 10 can include a communications network, such as a system bus 12, on which the following modules can communicate: a traction control module 14, a vehicle accessories module 16, an engine module 18, a powertrain module 20, a body control module 22 and a vehicle positioning and telemetric module 24. The modules 14, 16, 18, 20, 22 and 24, collectively referred to as "modules 26," can communicate with one another on the system bus 12 by sending digital messages 28 over the system bus 12 integrated in a vehicle 30. In a repair or aftermarket situation, for example, one or more external devices can communicate with the modules 26 on the system bus 12 and/or other suitable communications networks.

Figure 3:
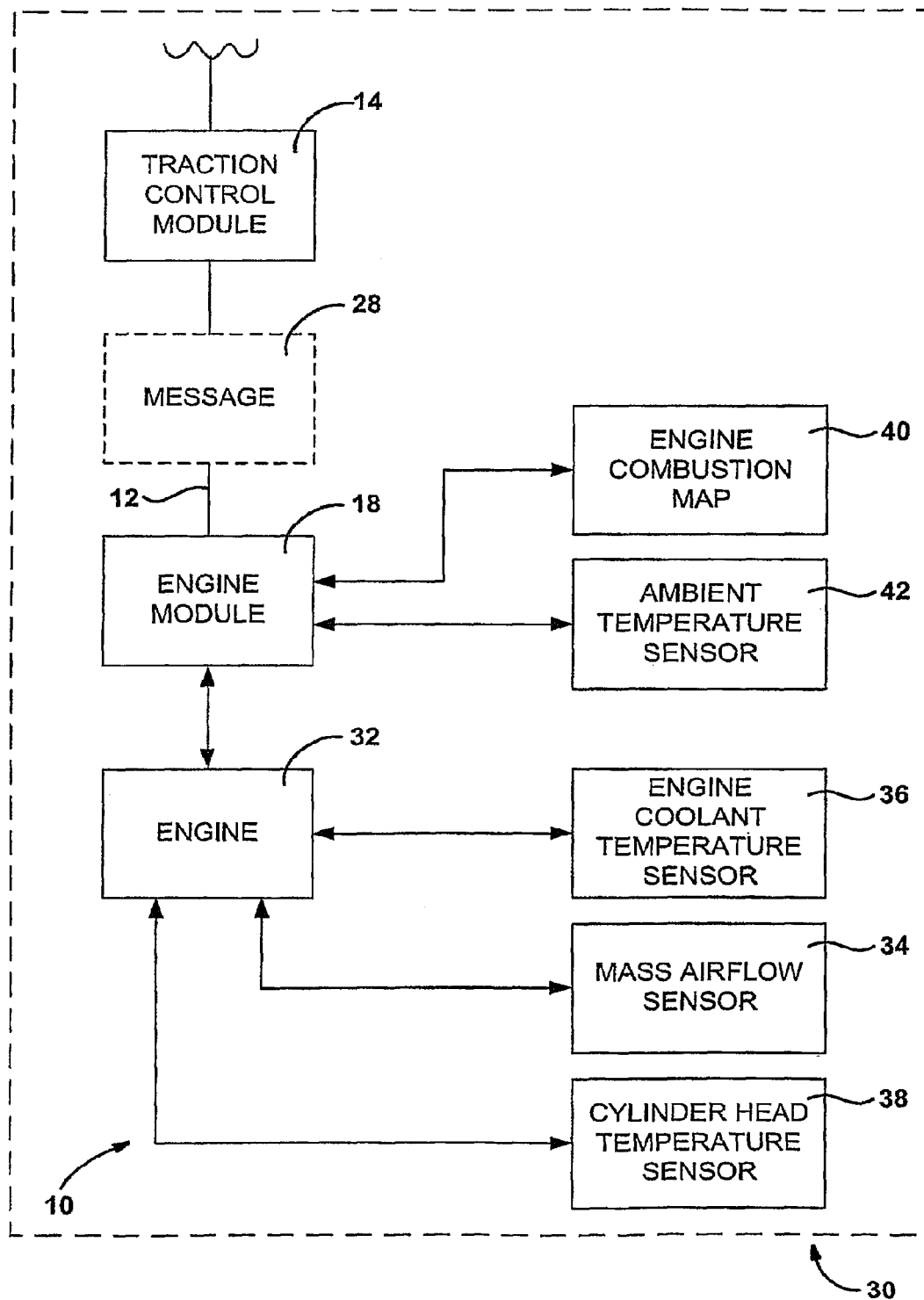
FIG. 3 is a diagram of an engine module of FIG. 2 communicating with an engine and various sensors and systems of the vehicle.

With reference to FIG. 3, the engine module 18 can connect to or communicate with an engine 32 of the vehicle 30. The engine 32 can have a mass airflow sensor 34 that can measure airflow into the engine 32. Information from the mass airflow sensor 34 can relate to load on the engine 32, as is known in the art. The engine module 18 can also connect to an engine coolant temperature sensor 36 and a cylinder head temperature sensor 38 that can monitor associated temperature conditions in the engine 32. In addition, the engine module 18 can connect to (or hold resident) an engine combustion map 40 and can communicate with an ambient temperature sensor 42. The engine module 18 can send the messages 28 over the system bus 12 that can include information from or about the above components that can be referenced by the traction control system 10, in whole or in part, when switching powertrain components between the active condition and the inactive condition.

Figure 4:
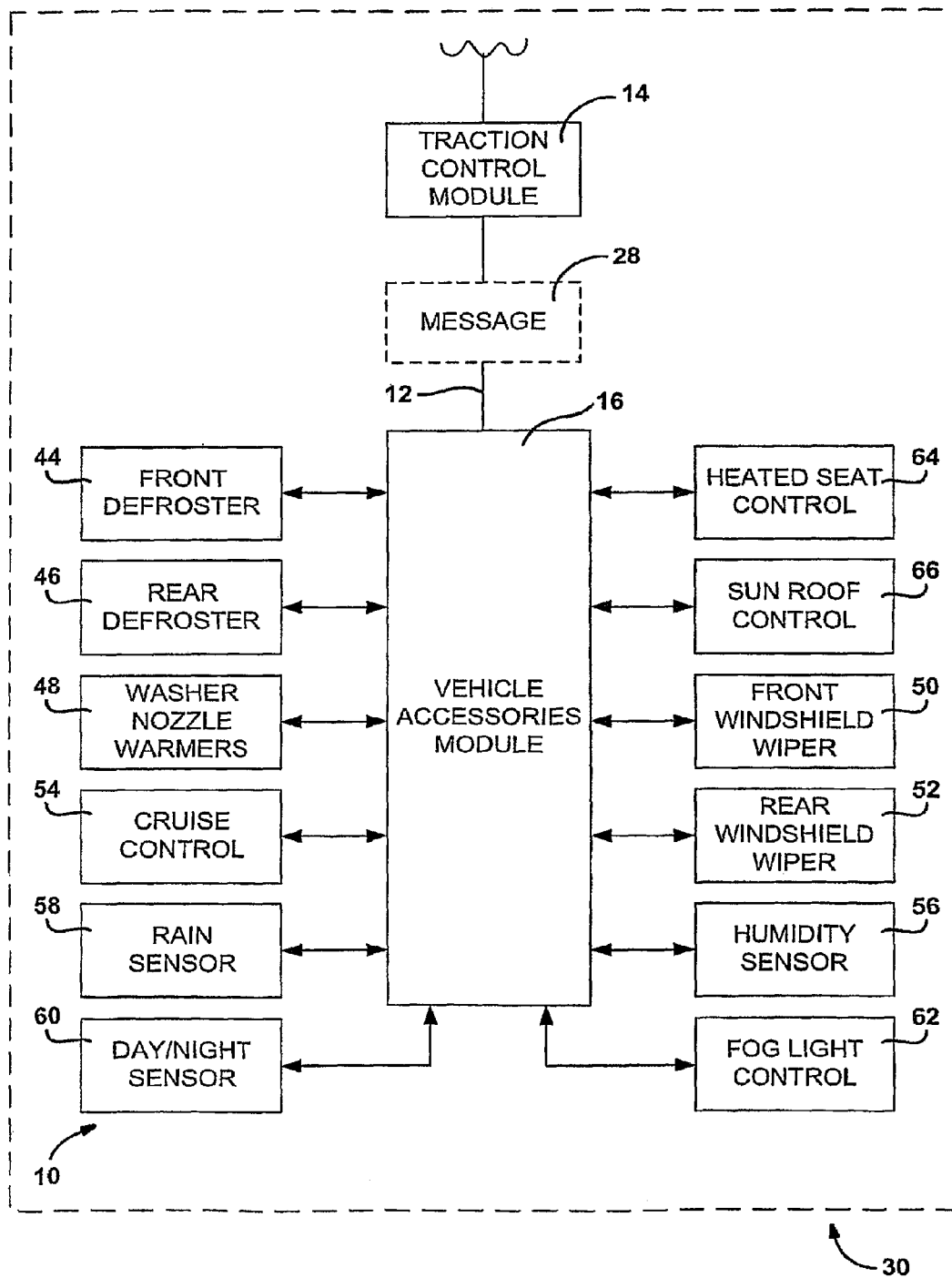
FIG. 4 is a diagram of a vehicle accessories module of FIG. 2 communicating with various sensors and systems of the vehicle, such as a rain sensor or cruise control.

With reference to FIG. 4, the vehicle accessories module 16 can connect to or communicate with various accessories that can be included with the vehicle 30. The vehicle 30 can have a front window defroster 44, a rear window defroster 46 and/or washer nozzle warmers 48. The user of the vehicle 30 can activate (or deactivate) the front window defroster 44, the rear window defroster 46 and/or the washer nozzle warmers 48 in, for example, inclement weather. The front window defroster 44, the rear window defroster 46 and/or the washer nozzle warmers 48 can warm the windshield or the washer nozzles to reduce ice or condensation thereon.

The vehicle 30 can also include a front windshield wiper 50 and a rear windshield wiper 52 that the user can activate or deactivate. Moreover, the user can adjust a frequency at which the front and/or rear windshield wipers 50, 52 cycle, i.e., an intermittent wiping frequency.

The vehicle 30 can further include cruise control 54. The cruise control 54 can be set by the user to hold the vehicle 30 at a certain speed. The cruise control 54 can be deactivated by manually adjusting the cruise control 54 or by braking of the vehicle 30 by means of a brake pedal (not shown). In addition, the user can adjust the speed at which the cruise control 54 maintains the vehicle 30.

The vehicle 30 can also include a humidity sensor 56, a rain sensor 58 and a day/night sensor 60. The humidity sensor 56 can detect a value descriptive of ambient humidity and changes thereto. The rain sensor 58 can detect whether the vehicle 30 is encountering precipitation and a rate thereof. The day/night sensor 60 can determine whether the vehicle 30 is operating during the day time or during the night time.

The vehicle 30 can include fog lights or other additional lights in addition to the regular driving and parking lights. The user can turn on or turn off the fog lights by way of a fog light control 62. The vehicle 30 can also contain heated seats. The heated seats can be activated by the user who can adjust a heated seat control 64 to activate, deactivate and regulate the heated seats. The vehicle 30 can also include a sunroof or a moonroof that the user can control by way of a sun roof control 66. The vehicle accessories module 16 can communicate the messages 28 over the system bus 12 that can include information from or about the above components that can be referenced by the traction control system 10, in whole or in part, when switching powertrain components between the active condition and the inactive condition.

Figure 5:
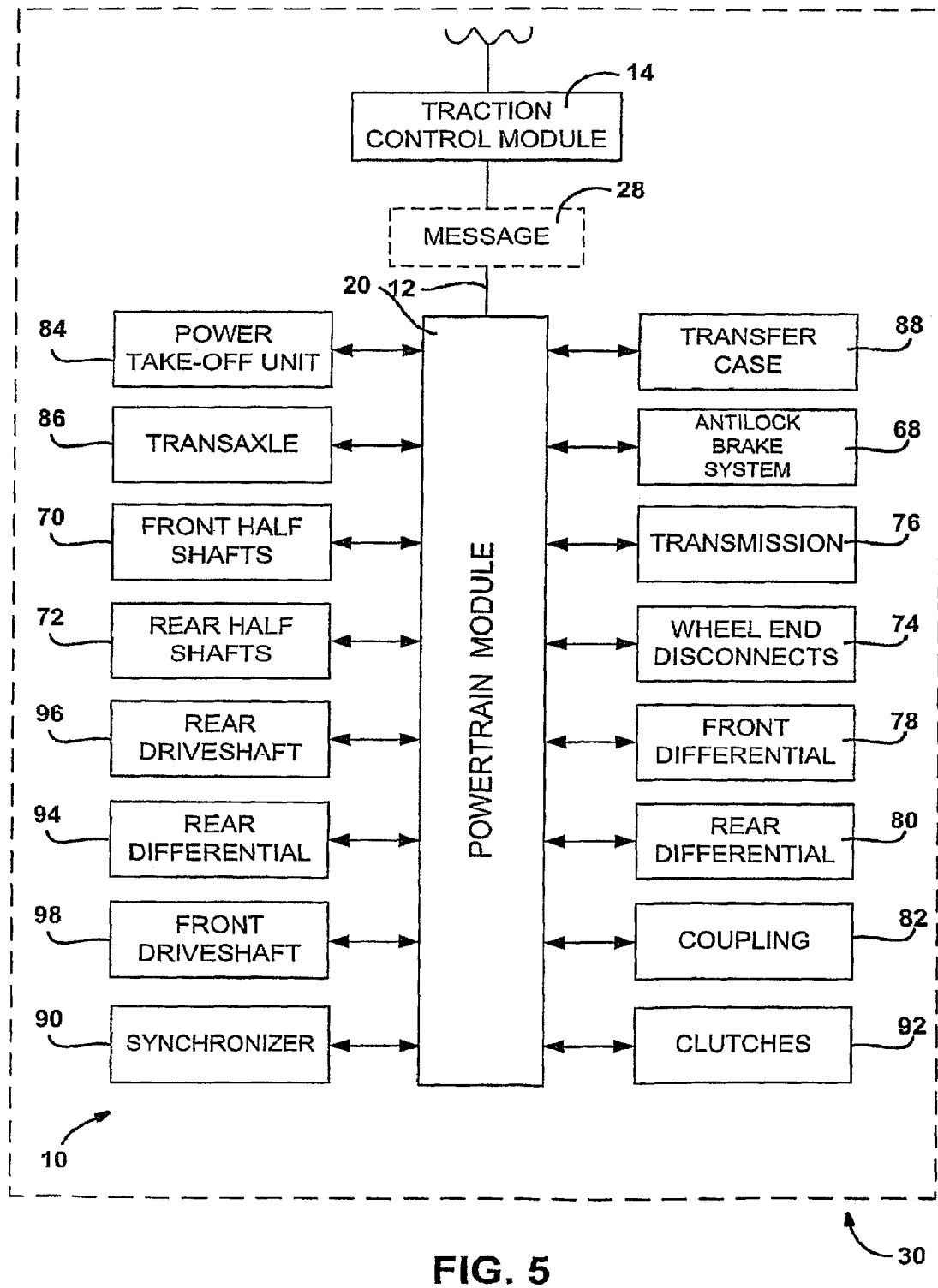
FIG. 5 is a diagram of a powertrain module of FIG. 2 communicating with various powertrain components, such as wheel end disconnects and front and rear drivetrains.

With reference to FIG. 5, the powertrain module 20 can connect to or communicate with various components and/or systems that can be included with the vehicle 30. The vehicle 30 can have an anti-lock braking system 68, as is known in the art. Briefly, the anti-lock braking system 68 can determine the wheels' rotational velocities and sufficient differences therebetween that can be indicative of slip. As with any of the modules 26, the powertrain module 20 can be capable of connecting to or communicating with one or more of the various suitable systems, controls, switches, assemblies, etc. on or associated with the vehicle 30 whether through the system bus 12 and/or through a direct connection (i.e., wired and/or wireless). In one aspect of the present teachings, the powertrain module 20 can be used across multiple vehicle models. In this regard, the powertrain module 20 or the modules 26 need not connect to everything with which the powertrain module 20 or the modules 26 can be configured to connect.

In addition, the powertrain module 20 can connect to front half shafts 70, rear half shafts 72, wheel end disconnects 74 and a transmission 76. The powertrain module 20 can also connect to a front differential 78, a rear differential 80 and one or more couplings 82. The powertrain module 20 can further connect to a power take off unit 84, a transaxle 86, a transfer case 88, synchronizers 90 and one or more clutches 92. The powertrain module 20 can also connect to a front driveshaft 94, a rear driveshaft 96 and, in examples with a single driveshaft, a main driveshaft 98. The powertrain module 20 can communicate the messages 28 over the system bus 12 that can include information from or about the above components that can be referenced by the traction control system 10, in whole or in part, when switching powertrain components between the active condition and the inactive condition.

Figure 6:
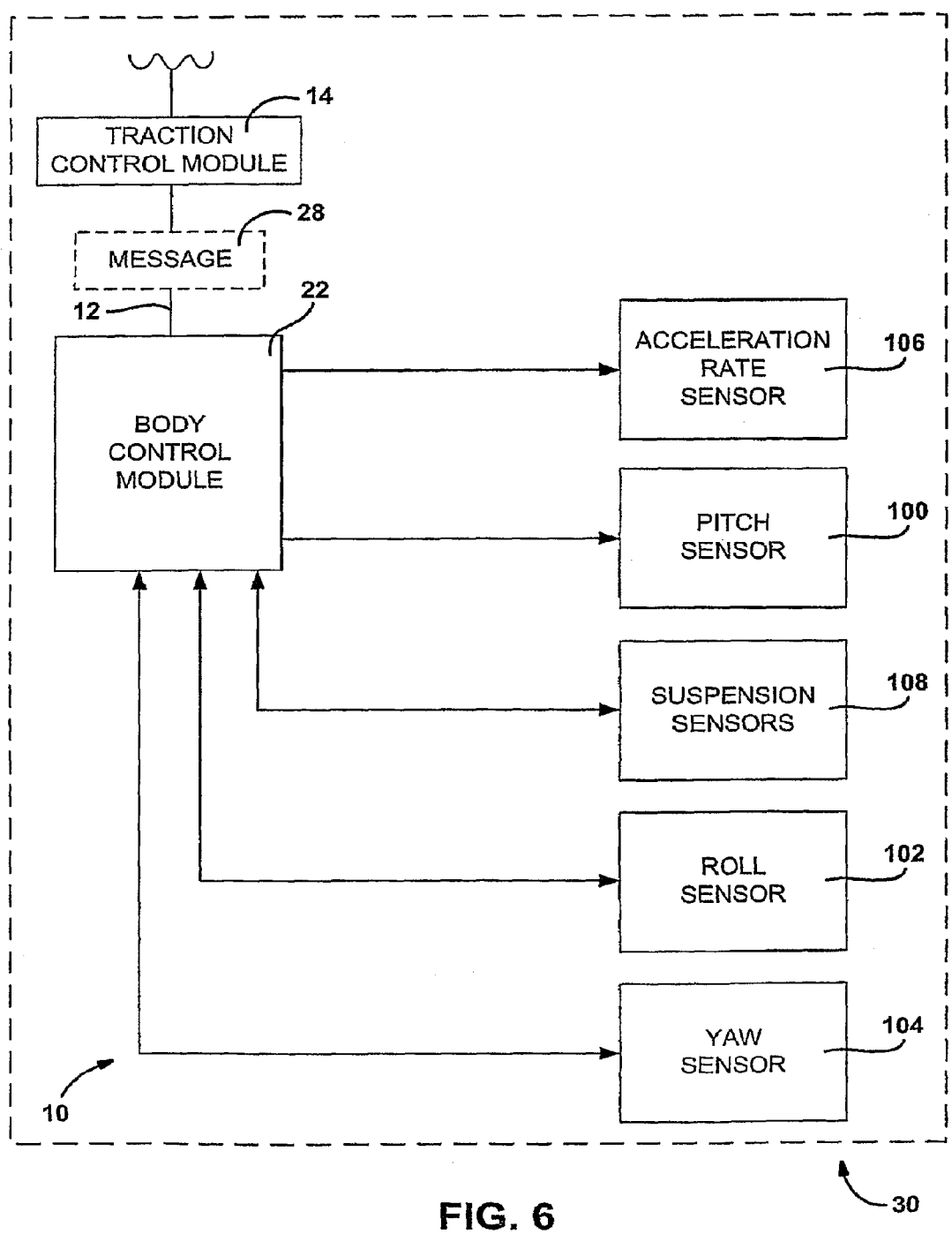
FIG. 6 is a diagram of a body control module of FIG. 2 communicating with an acceleration rate, pitch, roll and yaw sensor and one or more sensors associated with suspension on the vehicle.

With reference to FIGS. 2 and 6, the body control module 22 can connect to or communicate with various sensors and/or systems that can be included with the vehicle 30. The vehicle 30 can include a pitch rate sensor 100, a roll rate sensor 102 and a yaw rate sensor 104. The pitch rate sensor 100 can determine a value descriptive of vehicle pitch and changes thereto during various vehicle maneuvers, such as, braking. The roll rate sensor 102 can determine a value descriptive of vehicle roll and changes thereto during various maneuvers, such as, an emergency lane change. The yaw rate sensor 104 can determine a value descriptive of vehicle yaw and changes thereto during, for example, heavy braking or slip conditions. The pitch rate sensor 100, the roll rate sensor 102 and the yaw rate sensor 104 can communicate the position of the vehicle 30 and changes thereto to the body control module 22.

In addition, the vehicle 30 can include an acceleration rate sensor 106. The acceleration rate sensor 106 can determine the rate of acceleration (or deceleration) of the vehicle 30 and can communicate the rate to the body control module 22. The vehicle 30 can also include one or more suspension sensors 108 that can detect travel (e.g., extension and/or compression) of the various suspension components and can communicate information about the vehicle suspension to the body control module 22. The body control module 22 can communicate the messages 28 on the system bus 12 that can include information from or about the above components that can be referenced by the traction control system 10, in whole or in part, when switching powertrain components between the active condition and the inactive condition.

Figure 7:
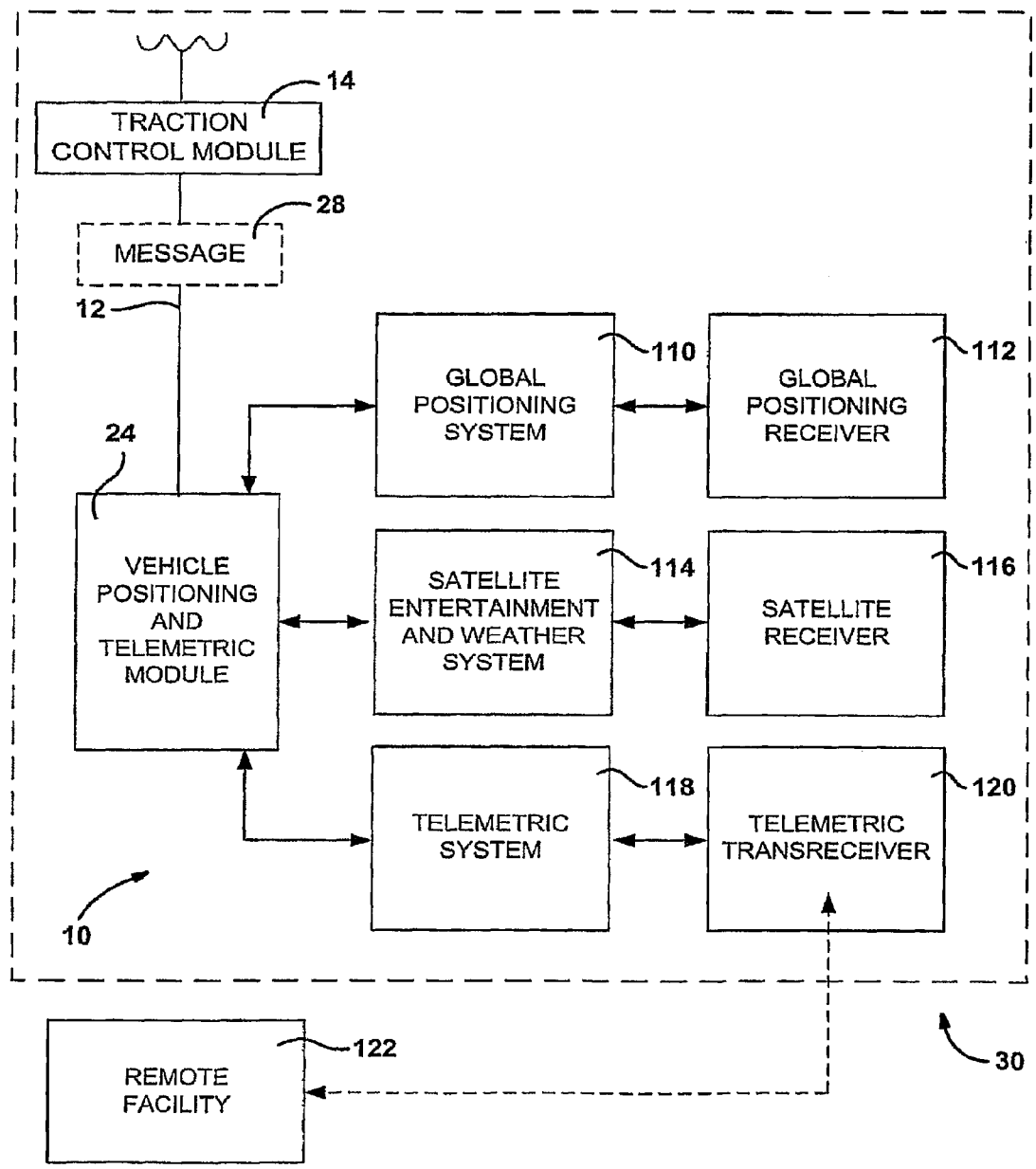
FIG. 7 is a diagram of a vehicle positioning, weather and telemetric module of FIG. 2 communication with various entertainment, positioning and/or telemetric systems of the vehicle, such as a global positioning system and a satellite weather information system.

With reference to FIG. 7, the vehicle positioning and telemetric module 24 can connect to or communicate with various components and/or systems that can be included with the vehicle 30. The vehicle 30 can include a global positioning system 110 having a global positioning satellite receiver 112 that can collect information from multiple global positioning satellites. The global positioning system 110 can also include geodetic information, road information, speed information and/or course variation information that can be relative to the vehicle 30. The geodetic information can include topographical and other geological information that can be relative to the position and/or future course of the vehicle 30. For example, road information can indicate that the vehicle 30 is traveling on unimproved or dirt roads. In other examples, the road information can indicate that the vehicle 30 can be traveling on highways, improved roadways, mountain switchbacks or windy roads that can have steep grades or tight turns. Speed information can indicate current speed, variations in speed and/or history of speed over a period. Course variation information can indicate, for example, deviation from a relatively straight course especially when road information does not correlate with the course change, e.g., quickly veering toward the shoulder of a road.

The vehicle 30 can also include a satellite entertainment and weather system 114 having a satellite receiver 116. By way of the satellite receiver 116, the satellite entertainment and weather system 114 can provide multimedia entertainment and weather to the vehicle 30 and its occupants. The satellite receiver 116 can communicate with satellites and/or terrestrial repeaters. The weather information can include current weather conditions and/or weather conditions that can be shortly encountered by the vehicle 30, e.g., up the road.

The vehicle positioning and telemetric module 24 can also communicate with a telemetric system 118. The telemetric system 118 can include a telemetric transceiver 120 that can communicate with remote facilities 122, other vehicles and/or other parties. The telemetric system 118 can communicate maintenance, technical and/or other suitable information about the vehicle 30. The telematic system 118 can communicate messages 28 on the system bus 12 that can include information from or about the above components and/or information received from any of the above satellites and/or repeaters that can be referenced by the traction control system 10, in whole or in part, when switching powertrain components between the active condition and the inactive condition.

With reference to FIG. 2, it will be appreciated by those skilled in the art that two or more of the modules 26 can be combined into a single module (e.g., a single multi-function module possibly having multiple submodules), that one or more of the modules 26 can be separated into multiple modules (i.e., more than two) communicating between one another and/or a combination thereof. For example, a single module can include and perform the functions of the traction control module 14, the engine module 18 and the drivetrain module 20.

Furthermore, the traction control system 10 can include more or less of the modules 26 as required to provide desired functionality and the individual modules 14, 16, 18, 20, 22 and 24 can contain more or less functionality than described herein. In this regard, the traction control system 10 can be configured such that it does not automatically activate or inactivate one or more powertrain components based on messages generated by or in response to a particular module (e.g., the vehicle positioning and telemetric module 24), a particular sensor (e.g., day/night sensor FIG. 4)) and/or a particular switch (e.g., the heated seat control 64 (FIG. 4)). Further yet, one or more of the modules 26 can be activated or deactivated or otherwise accessed remotely by wired or various forms of wireless electromagnetic wave communication.

As used herein, the term module, control module, component and/or device can refer to one or more of the following: an application specific integrated circuit (ASIC), an electronic circuit, a processor (shared, dedicated or group) and memory that executes one or more software or firmware programs, a combinational logic circuit and/or other suitable mechanical, electrical or electromechanical components that can provide the described functionality. Moreover, the modules 26 can communicate with other modules, devices, components, sensors or systems using digital and/or analog inputs and outputs and/or a suitable communications network by way of the above wired and/or wireless connection. The wired communication can use, in whole or in part, various forms of digital communication, for example, GMLAN, CAN, or JLAN. The wired communication can also use, in whole or in part, various forms of analog communication.

Figure 8:
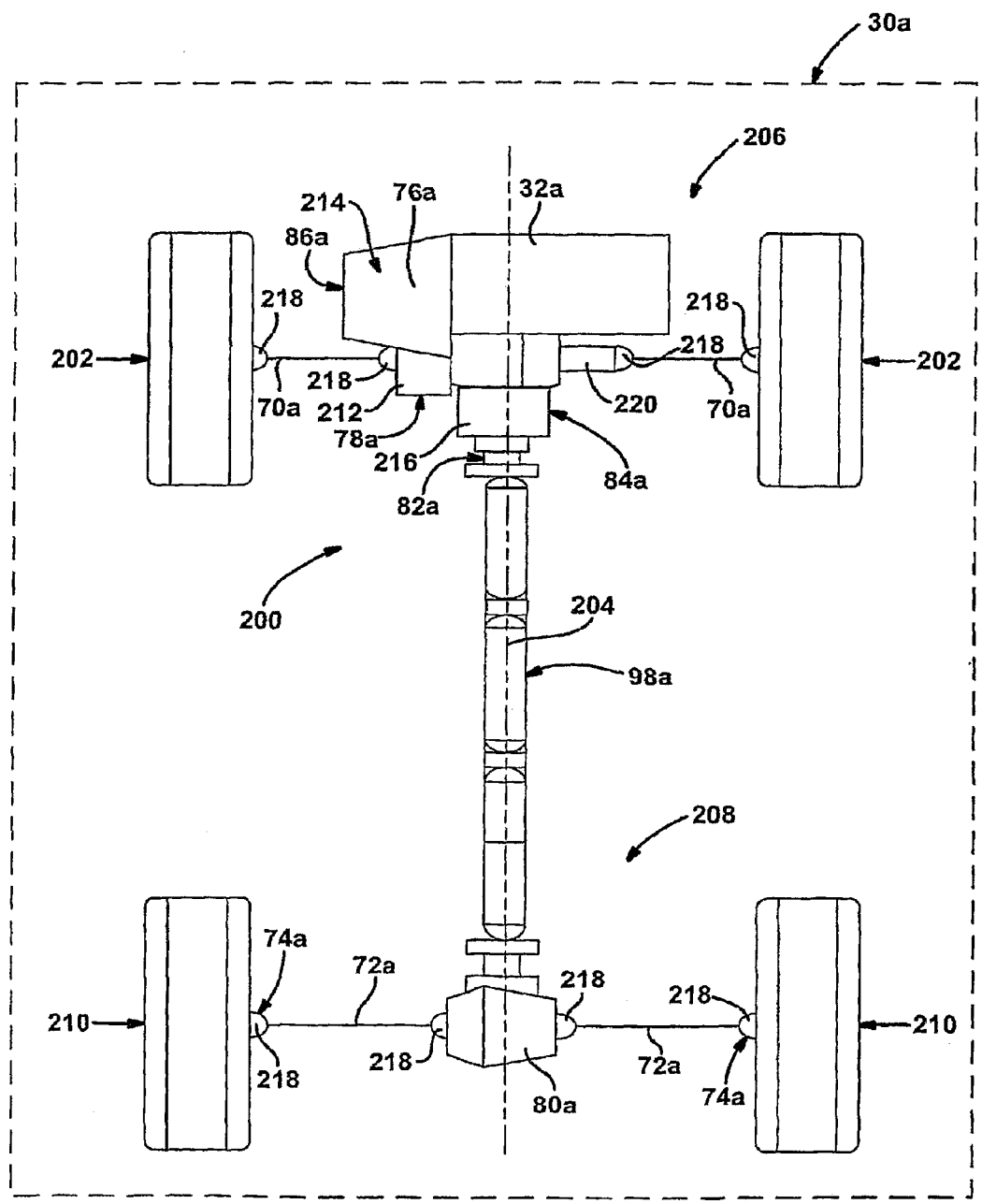
FIG. 8 is a diagram of an exemplary vehicle having a powertrain that can deliver power to all four wheels that includes a rear drivetrain with one or more components that can be operable in an active or in an inactive condition in accordance with the present teachings.

In one aspect of the present teachings and with reference to FIG. 8, a vehicle 30a can include a powertrain 200 having the four or the all wheel drive configuration that typically directs more power to front wheels 202. The powertrain 200 can connect to an engine 32a that can be mounted transversely, i.e., generally perpendicular to a longitudinal axis 204 of the vehicle 30a. The powertrain 200 can include a front drivetrain 206 and a rear drivetrain 208. The front drivetrain 206 can include a transmission 76a that can be part of a transaxle 86a. The front drivetrain 206 can deliver power from the engine 32a to the front wheels 202, while the rear drivetrain 208 can deliver power from a power take off unit 84a to rear wheels 210 by way of multiple gear ratios of the transmission 76a.

The front drivetrain 206 includes the transaxle 86a that can include a front differential 78a to direct power to front half shafts 70a of the front wheels 202, respectively. The front differential 78a can be housed in a differential housing 212 of the transaxle 86a, while other portions of the transaxle 86a can be housed in a main transaxle housing 214. The transaxle 86a can connect to the power take off unit 84a that can selectively direct power to the rear wheels 210 via a main driveshaft 98a. As such, the main driveshaft 98a, can connect the transaxle 86a to a rear differential 80a via the power take off unit 84a. Rear half shafts 72a can extend from the rear differential 80a and thus can connect the rear wheels 210, respectively, to the transaxle 86a.

The rear wheels 210 can have wheel end disconnects 74a, which can be commonly referred to as hublocks. The wheel end disconnects 74a can permit the wheels 202, 210 to be coupled to or uncoupled from the half shafts 70a, 72a, respectively. By disconnecting the wheels 202, 210 from the half shafts 70a, 72a, the wheels 202, 210 can spin independently of the half shafts 70a, 72a and other components of the front and the rear drivetrains 206, 208. One of example of suitable wheel end disconnects is the Integrated Wheel End disconnect technology from Warn industries, Inc. of Clackamas, Oreg.

The transaxle 86a can also include a coupling 82a that can be housed in a power take-off unit housing 216. The coupling 82a can couple and uncouple the transaxle 86a to/from the main driveshaft 98a. When the main driveshaft 98a is uncoupled by the coupling 82a, the main driveshaft 98a can be in the inactive condition, which can also be referred to as idle or in an idle condition, because the main driveshaft 98a is no longer being driven by the engine 32a. Moreover, the wheel end disconnects 74a can disconnect the rear wheels 210 from the rear half shafts 72a, respectively, and the coupling 82a can disconnect the main driveshaft 98a from the power take-off unit 84a. With both the main driveshaft 98a disconnected from the transaxle 86a and the rear wheels 210 disconnected from the rear half shafts 72a by the wheel end disconnects 74a, the main driveshaft 98a, the rear differential 80a and the rear half shafts 72a can be idle, i.e., in the inactive condition.

As those skilled in the art will appreciate, the manner in which one or more powertrain components idle, i.e., are in the inactive condition, is dependant upon its particular configuration. In some instances, the one or more components can rotate (e.g., can be back driven by one or more of the vehicle wheels) or can be stationary relative to a housing of the powertrain component. Accordingly, it will be appreciated that the powertrain components that are idle are not receiving rotary power to drive one or more of the vehicle wheels. It will also be appreciated, for example, that any savings realized by not delivering rotary power to the main driveshaft 98a would be reduced if the rear wheels 210 back drive the rear half shafts 72a. Engine power and torque not directly consumed by the powering of the one or more components of the rear drivetrain 208, can nonetheless be consumed indirectly by the back driving of the one or more powertrain components by the rear wheels 210.

The coupling 82a can also reconnect the main driveshaft 98a to the transaxle 86a. The wheel end disconnects 74a can also reconnect the rear wheels 210 to the half shafts 72a, respectively. In this regard, the synchronizers 90 (FIG. 5) can synchronize the speed of the components of the rear drivetrain 208 in the active condition to match rotational speeds of components in the active condition before re-coupling the components using suitable clutches 92 (FIG. 5), as is known in the art. Additionally, constant velocity joints 218 can be employed between the rear wheels 210, the rear half shafts 72a and the rear differential 80a and/or between the front wheels 202, the front half shafts 70a and the transaxle 86a. Furthermore, a front differential extension 220 can be employed to generally maintain the front half shafts 70a at generally an equal length.

Figure 9:
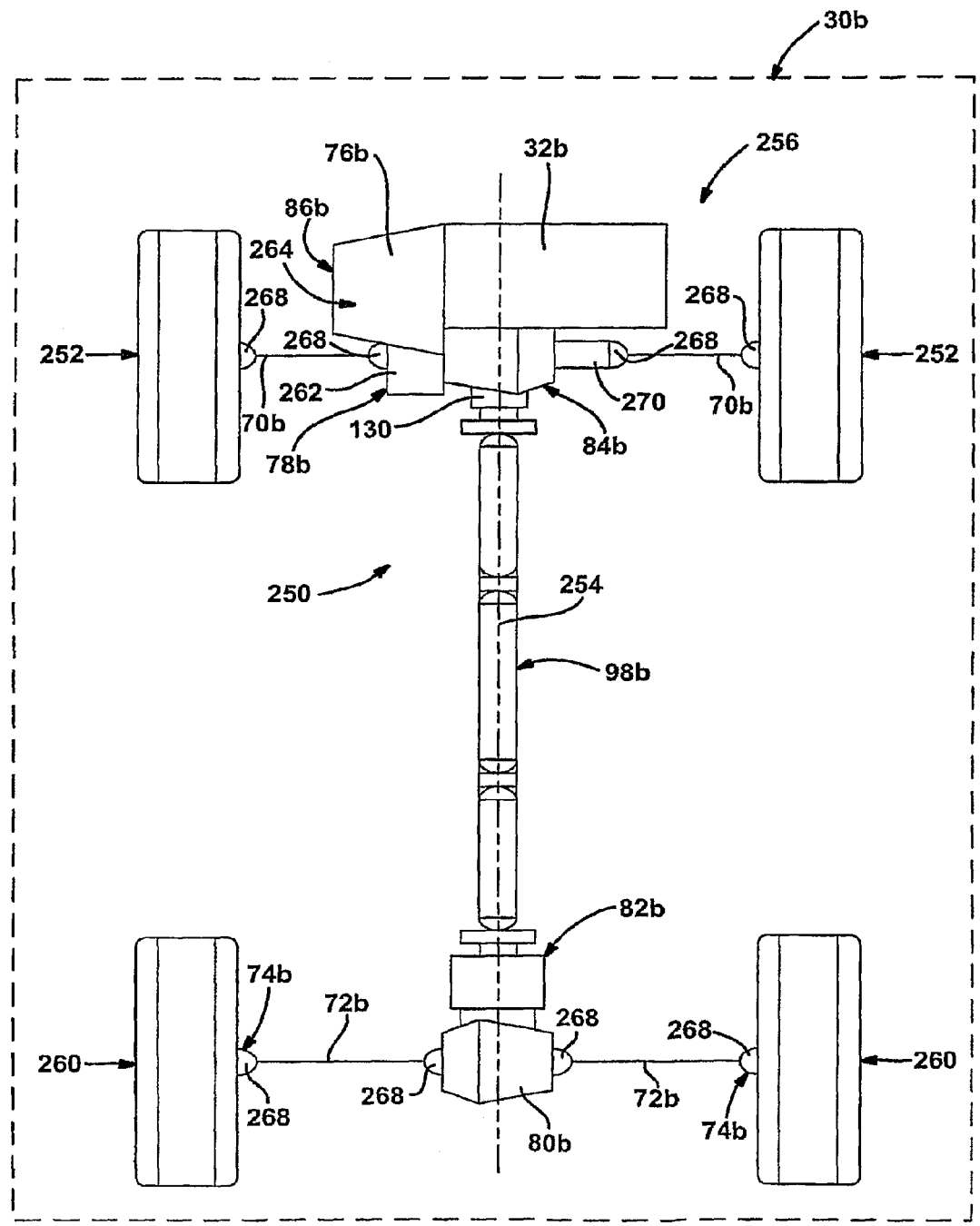
FIG. 9 is similar to FIG. 8 and shows another exemplary vehicle.

In one aspect of the present teachings and with reference to FIG. 9, a vehicle 30b can include a powertrain 250 having the four or the all wheel drive configuration that typically directs more power to front wheels 252. The powertrain 250 can connect to an engine 32b that can be mounted transversely, i.e., generally perpendicular to a longitudinal axis 254 of the vehicle 30b. The powertrain 250 can include a front drivetrain 256 and a rear drivetrain 258. The front drivetrain 256 can include a transmission 76b that can be part of a transaxle 86b. The front drivetrain 256 can deliver power from the engine 32b to the front wheels 252, while the rear drivetrain 258 can deliver power from a power take off unit 84b to rear wheels 260 by way of multiple gear ratios of the transmission 76b.

The vehicle 30b can be similar the vehicle 30a, as illustrated in FIG. 8, but a coupling 82b can be between a rear differential 80b and a main driveshaft 98b and not between the power take-off unit 84a and the main driveshaft 98a, as shown in FIG. 8. As such, the front drivetrain 256 includes the transaxle 86b that can include a front differential 78b to direct power to front half shafts 70b that can be coupled to the front wheels 252, respectively. The front differential 78b can be housed in a differential housing 262 of the transaxle 86b, while other portions of the transaxle 86b can be housed in a main transaxle housing 264. The transaxle 86b can connect to the power take off unit 84b that can selectively direct power to the rear wheels 210 via the main driveshaft 98b. The main driveshaft 98b can connect the transaxle 86b to the rear differential 80b via the power take off unit 84b. Rear half shafts 72b can extend from the rear differential 80b and thus can couple the rear wheels 210, respectively, to the transaxle 86b.

When the main driveshaft 98b is disconnected from the rear differential 80b by the coupling 82b and the rear wheels 210 are disconnected from the rear half shafts 72b, respectively, by wheel end disconnects 74b, the rear differential 80b and the rear half shafts 72b can be idle or be in the inactive condition. The coupling 82b can also reconnect the main driveshaft 98b to rear differential 80b and the wheel end disconnects 74b can reconnect the rear wheels 210 to the half shafts 72b, respectively. Similar to the vehicle 30a in FIG. 8, the vehicle 30b can include constant velocity joints 268 that can be employed between the rear wheels 210, the rear half shafts 72b and the rear differential 80b and/or between the front wheels 252, the front half shafts 70b and the transaxle 86b. In addition, a front differential extension 270 can be employed to maintain the front half shafts 70b at generally equal lengths.

Figure 10:
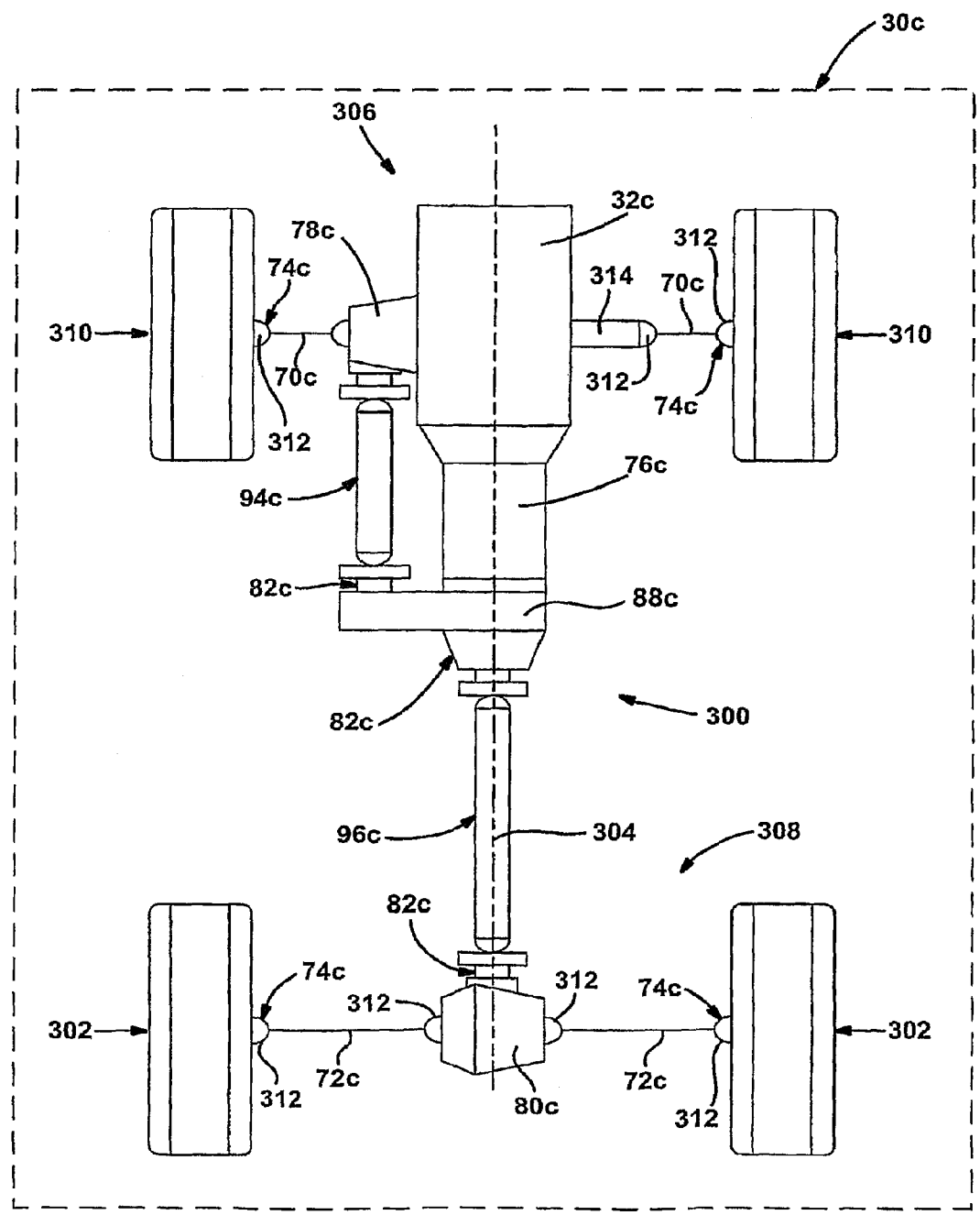
FIG. 10 is a diagram of an exemplary vehicle having a powertrain that can deliver power to all four wheels and a front and a rear drivetrain with one or more components that can be operable in an active or in an inactive condition in accordance with the present teachings.

In a further aspect of the present teachings and with reference to FIG. 10, a vehicle 30c can include a powertrain 300 having the four or the all wheel drive configuration that typically directs more power to rear wheels 302. The powertrain 300 can connect to an engine 32c that can be mounted longitudinally, i.e., generally parallel to a longitudinal axis 304 of the vehicle 30c. The powertrain 300 can include a front drivetrain 306 and a rear drivetrain 308. The front drivetrain 306 can include a transmission 76c that can connect to a transfer case 88c. The transfer case 88c can connect to a front driveshaft 94c and a rear driveshaft 96c. The front driveshaft 94c can connect to a front differential 78c, while a rear driveshaft 96c can connect to a rear differential 80c.

A coupling 82c can be housed in or associated with the transfer case 88c and can couple and can uncouple the front driveshaft 94c to/from the transfer case 88c. In addition, wheel end disconnects 74c can disconnect the front wheels 210 from front half shafts 70c, respectively, that can extend from the front differential 78c. With the front wheels 310 disconnected from the front half shafts 70c and the front driveshaft 94c disconnected from the transfer case 88c, the front differential 78c, the front half shafts 70c and the front driveshaft 94c can be idle or be in the inactive condition. While in the inactive condition, the front driveshaft 94c, the front differential 78c and front half shafts 70c can be operable to not receive power from the engine 32c and can be operable to not be driven by the front wheels 310.

The wheel end disconnects 74c and the coupling 82c can reengage the front driveshaft 94c, the front differential 78c and the front half shafts 70c and, thus, restore the above components to the active condition. When doing so, the rotational velocities of the various components of the powertrain 300 can be generally matched using synchronizers 90 (FIG. 5). Furthermore, the vehicle 30c can include constant velocity joints 312 that can be employed between the rear wheels 302, the rear half shafts 72c and the rear differential 80c and/or between the front wheels 310, the front half shafts 70c and the front differential 78c. In addition, a front differential extension 314 can be employed to maintain the front half shafts 70c at generally equal lengths.

In further examples, the coupling 82c can be used in tandem with the wheel end disconnects 74c on the rear wheels 310, respectively, to switch components of the rear drivetrain 308 between the active or the inactive condition. In this regard, the coupling 82c can be between the rear driveshaft 96c and the transfer case 88c. As such, the rear driveshaft 96c, the rear differential 80c and the rear half shafts 72c can be placed in the active and the inactive condition. When the coupling 82c is between the rear driveshaft 96c and the rear differential 80c, the rear differential 80c and the rear half shafts 96c can be placed in the active and the inactive condition.

Figure 11:
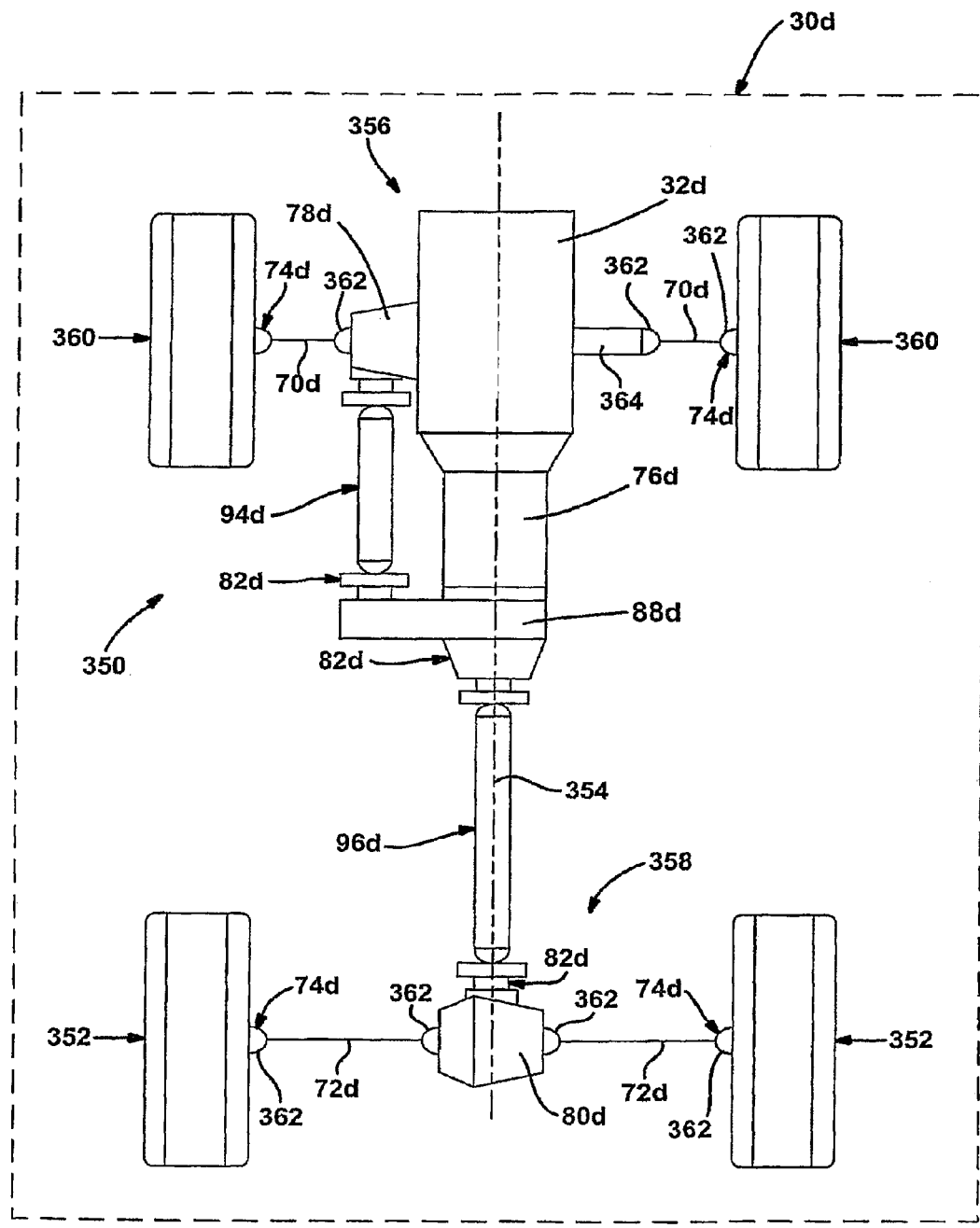
FIG. 11 is similar to FIG. 10 and shows another exemplary vehicle.
Figure 12:
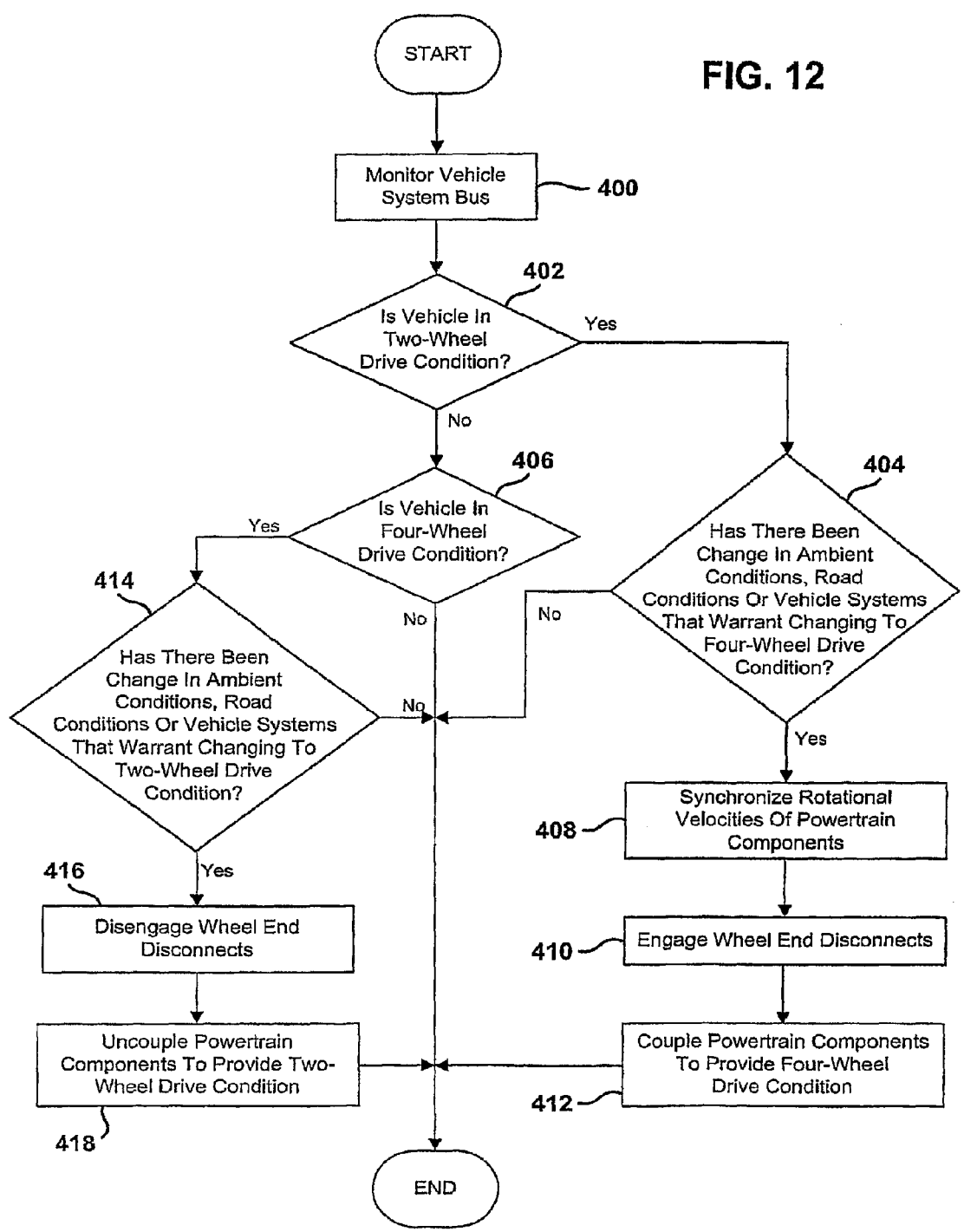
FIG. 12 is a flow chart showing the traction control system switching one or more powertrain components of the vehicle between the active condition and the inactive condition based on information received on the communications network in accordance with the present teachings.
Figure 13:
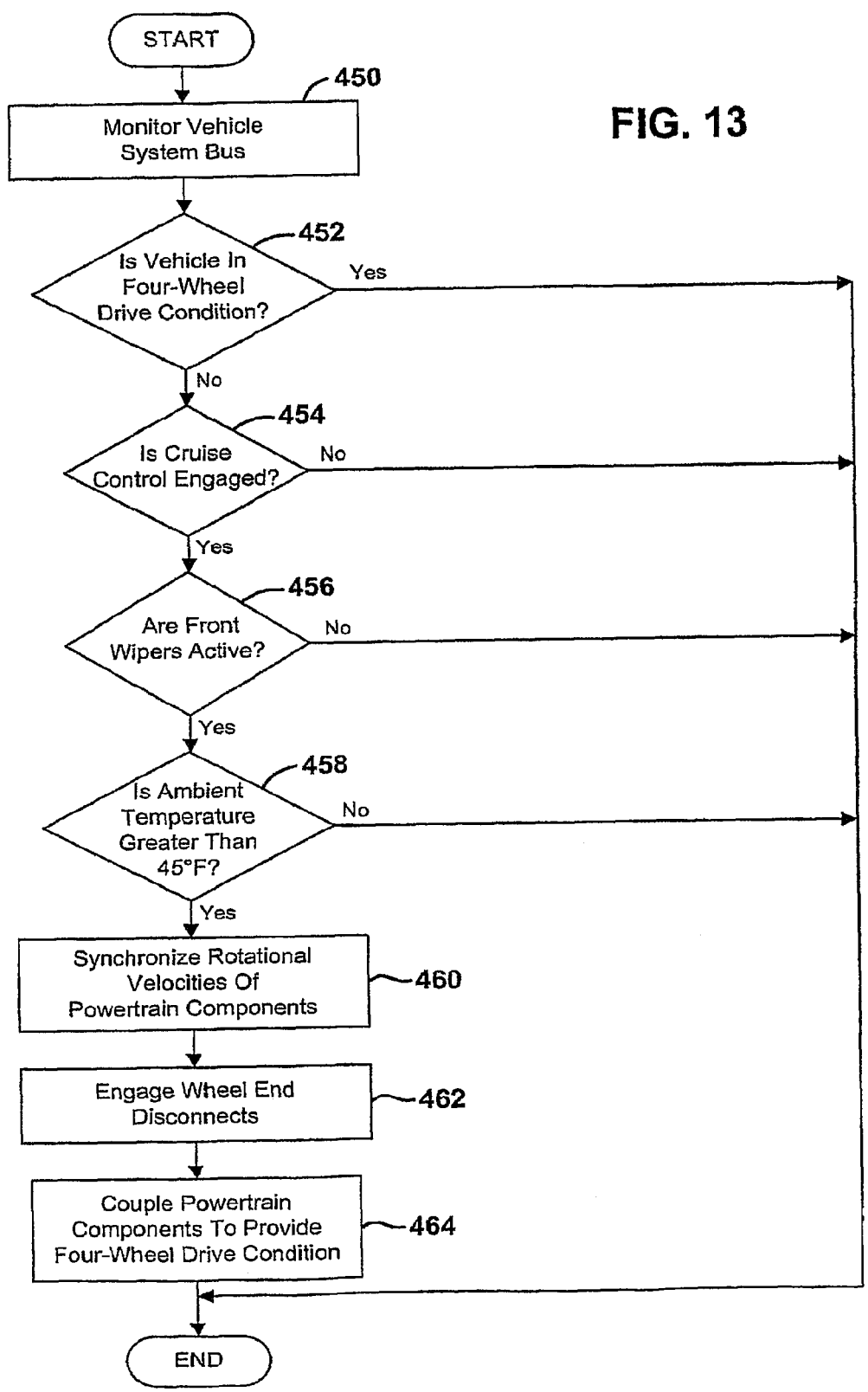
FIG. 13 is a flow chart showing the traction control system switching the one or more powertrain components of the vehicle to the active condition based on information received on the communications network in accordance with the present teachings.
Figure 14:
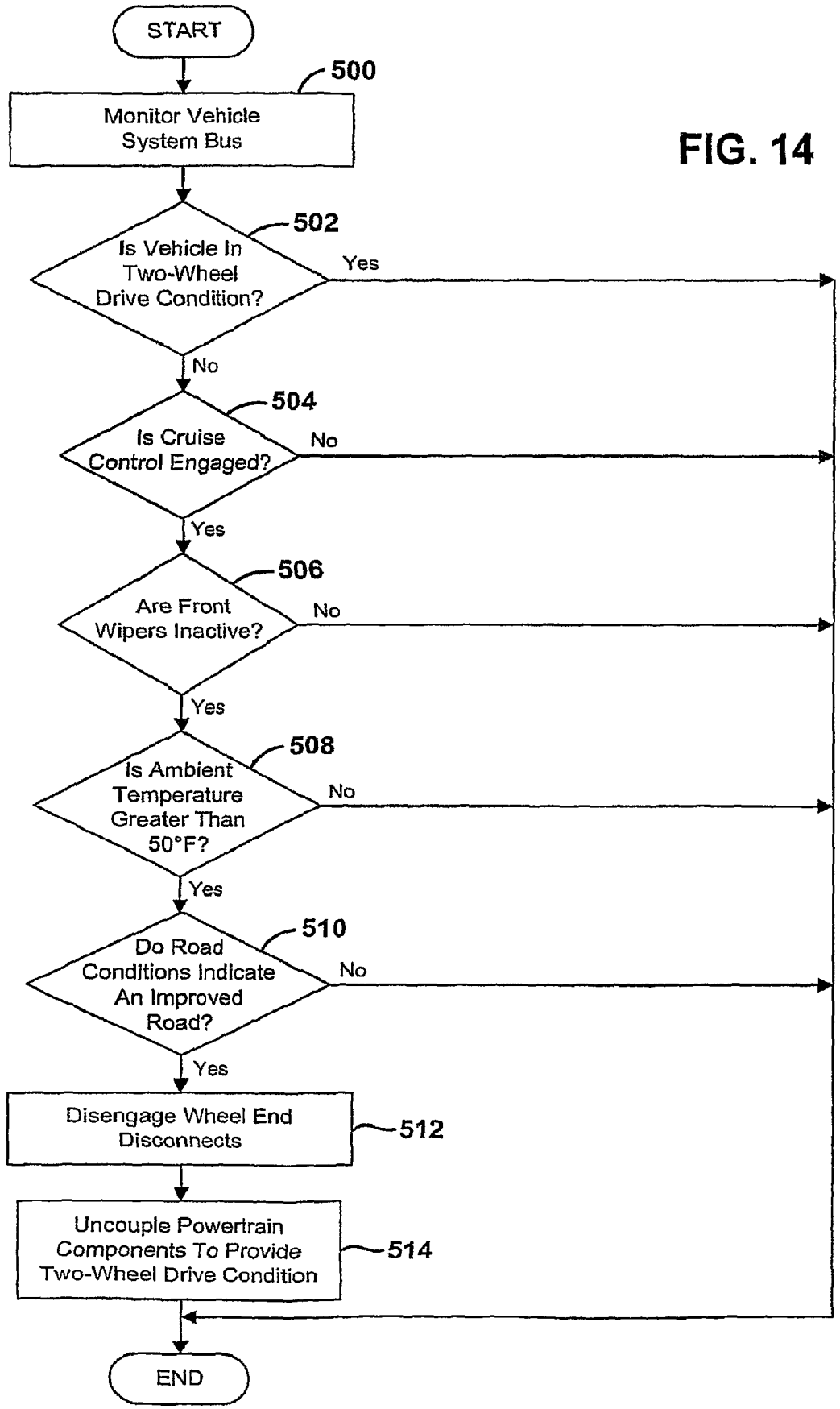
FIG. 14 is a flow chart showing the traction control system switching one or more powertrain components of the vehicle to the inactive condition based on information received on the communications network in accordance with the present teachings.
Figure 15:
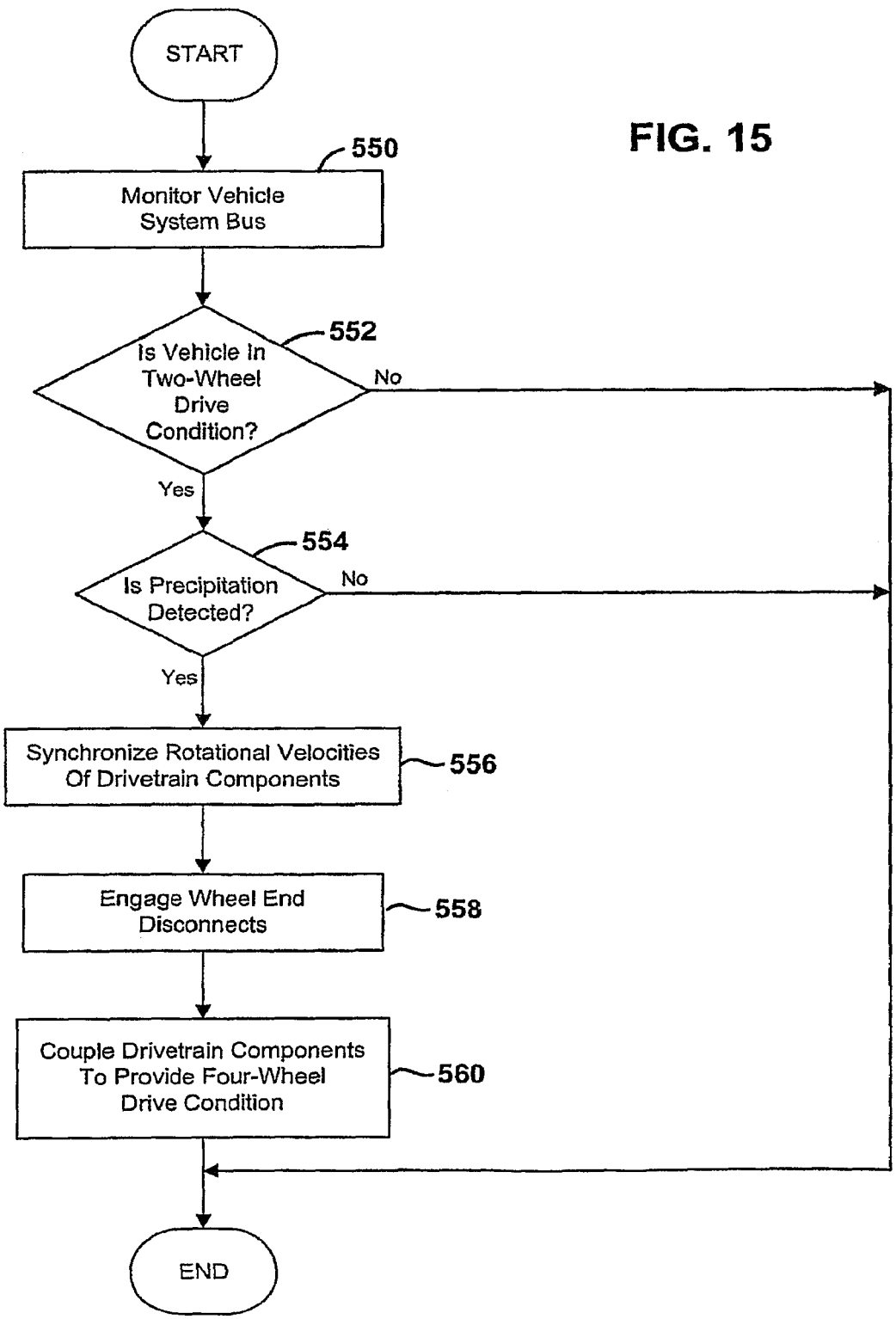
FIG. 15 is similar to FIG. 13 and shows switching to the active condition based on information received on the communications network in accordance with the present teachings.
Figure 16:
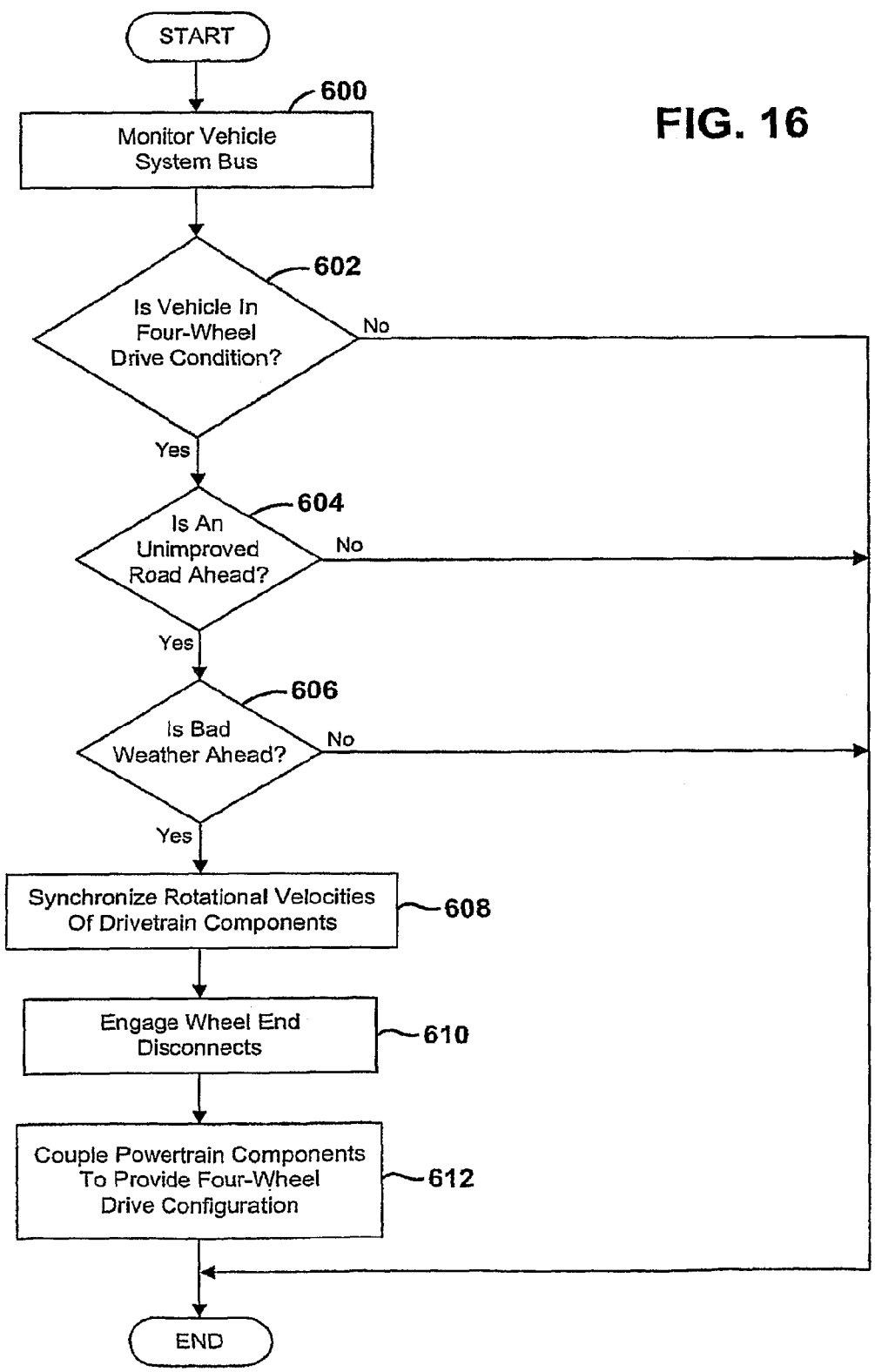
FIG. 16 is similar to FIG. 14 and shows switching to the inactive condition based on information received on the communications network in accordance with the present teachings.

In a further aspect of the present teachings and with reference to FIG. 11, a vehicle 30d can include a powertrain 350 having the four or the all wheel drive configuration that typically directs more power to rear wheels 352. The powertrain 350 can connect to an engine 32d that can be mounted longitudinally, i.e., generally parallel to a longitudinal axis 354 of the vehicle 30d. The powertrain 350 can include a front drivetrain 356 and a rear drivetrain 358. The front drivetrain 356 can include a transmission 76d that can connect to a transfer case 88d. The transfer case 88d can connect to a front driveshaft 94d and a rear driveshaft 96d. The front driveshaft 94d can connect to a front differential 78d, while a rear driveshaft 96d can connect to a rear differential 80d.

The front differential 78d can be operable to provide an axle disconnect functionality. The axle disconnect functionality can permit the front half shafts 70d to couple and uncouple to-from the front differential 78d. With the front half shafts 70d uncoupled from the front differential 78d, front wheels 360 can be operable to not drive the front differential 78d but can still be operable to drive the front half shafts 70d. In addition, a coupling 82d in or associated with the transfer case 88d can couple and uncouple the front driveshaft 94d to/from the transfer case 88d to switch the front driveshaft 94d between the active and the inactive condition. The front differential 78d can reengage the front half shafts 70d and the transfer case 88d can reengage the front driveshaft 94d to switch the components of the front drivetrain 356 to the active condition.

As in the vehicles 30a, 30b, 30c, the rotational velocities of the various components of the powertrain 350 can be generally matched when coupling the components together. The vehicle 30d can also include constant velocity joints 362 that can be employed between the rear wheels 352, the rear half shafts 72d and the rear differential 80d and/or between the front wheels 360, the front half shafts 70d and the front differential 78d. In addition, a front differential extension 364 can be employed to maintain the front half shafts 70d at generally equal lengths.

In further examples, additional couplings 82d can be used in tandem with the wheel end disconnects 74d on the rear wheels 360 to switch components of the rear drivetrain 358 between the active or the inactive condition. When the coupling 82d is between the rear driveshaft 96d and the transfer case 88d, the rear driveshaft 96d, the rear differential 80d and the rear half shafts 72d can be switched between the active and the inactive conditions. When the coupling 82d is between the rear driveshaft 96d and the rear differential 80d, the rear differential 80d and the rear half shafts 96d can be switched between the active and the inactive conditions.

In one aspect of the present teachings and with reference to FIGS. 5 and 8-12, the traction control system 10 can determine when to automatically couple or uncouple one or more components of the powertrain 200, 250, 300, 350 to thus switch the one or more components between the active or the inactive condition. For example, control can monitor the vehicle system bus 12, as illustrated in step 400. In step 402, control can determine whether the vehicle 30, 30a, 30b, 30c, 30d is in a two wheel drive condition, thus one or more components of the powertrain 200, 250, 300, 350 are idle, i.e., are in the inactive condition. Control can determine that the vehicle 30, 30a, 30b, 30c and 30d is in the two wheel drive condition by monitoring the powertrain module 20 over the system bus 12. When control determines that the vehicle 30, 30a, 30b, 30c, 30d is in the two wheel drive condition, control can continue in step 404. When control determines that the vehicle 30, 30a, 30b, 30c, 30d is not in the two wheel drive condition, control can continue in step 406.

In step 404, control can determine whether there has been a change in one or more ambient conditions, road conditions and/or changes to one or more components and/or systems of the vehicle 30, 30a, 30b, 30c, 30d that warrants changing from the two wheel condition to the four wheel or all wheel drive condition. When control determines that there has been the change in one or more of the ambient conditions, the road conditions and/or the changes to one or more of the vehicle systems that warrants changing to the four wheel drive condition, control can continue in step 408. When control determines that there has not been the change in one or more of the ambient conditions, the road conditions and/or the changes to one or more of the vehicle systems that warrants changing to the four wheel drive condition, control can end.

In step 408, control can synchronize rotational velocities of the one or more components of the powertrain 200, 250, 300, 350. For example and with reference to FIGS. 2 and 10, the traction control system 10 can generally match the rotational velocity of the front drivetrain 306 to the rotational velocity of the transfer case 88c. In step 410 and returning to FIGS. 5 and 8-12, control 10 can engage the wheel end disconnects 74, 74a, 74b, 74c, 74d that can couple the front drivetrain 206, 256, 306, 356 to the front wheels 202, 252, 310, 360, respectively. In step 412, control can couple the components of the powertrain 200, 250, 300, 350 that were uncoupled to provide the four wheel or all wheel condition and thus restore all of the powertrain components to the active condition.

In step 406, control can determine whether the vehicle 30, 30a, 30b, 30c, 30d is in the four wheel or all wheel drive condition and therefore all of the components of the powertrain 200, 250, 300, 350 are in the active condition by, for example, monitoring the powertrain module 20 on the system bus 12. When control determines that the vehicle 30, 30a, 30b, 30c, 30d is in the four wheel or all wheel drive condition, control can continue in step 414. When control determines that the vehicle 30, 30a, 30b, 30c, 30d is not in the four wheel or all wheel drive condition, control can end.

In step 414, control can determine whether there has been a change in one or more ambient conditions, road conditions and/or changes to one or more vehicle systems that warrant changing from the four wheel or all wheel condition to the two wheel drive condition. When control determines that there has been the change in one or more of the ambient conditions, the road conditions and/or the changes to one or more of the vehicle systems that warrants changing to the two wheel drive condition, control can continue in step 416. When control determines that there has not been the change in one or more of the ambient conditions, the road conditions and/or the changes to one or more of the vehicle systems that warrants changing to the four wheel drive condition, control can end.

In step 416, control can disengage the wheel end disconnects 74, 74a, 74b, 74c, 74d that can uncouple the front drivetrain 206, 256, 306, 356 from the front wheels 202, 252, 310, 360, respectively, and/or can uncouple the rear drivetrain 208, 258, 308, 358 from the rear wheels 210, 260, 302, 352, respectively. In step 418, control can uncouple the components of the powertrain 200, 250, 300, 350 that were coupled to provide the two wheel drive condition and thus place one or more components of the powertrain 200, 250, 300, 350 in inactive condition. From step 418, control can end.

In a further aspect of the present teachings and with reference to FIGS. 5, 8-11 and 13, the traction control system 10 can determine when to switch one or more components of the powertrain 200, 250, 300, 350 between the active or the inactive condition. In one example, control can monitor the vehicle system bus, as illustrated in step 450. In step 452, control can determine whether the vehicle 30, 30a, 30b, 30c, 30d is in the four wheel or the all wheel drive condition such that all of the components of the powertrain 200, 250, 300, 350 are in the active condition. When control determines that the vehicle 30, 30a, 30b, 30c, 30d is in the four wheel or all wheel drive condition, control can end. When control determines that the vehicle 30, 30a, 30b, 30c, 30d is not in the four wheel or all wheel drive condition, i.e., is in the two wheel drive condition, control can continue in step 454.

In step 454, control can determine whether the cruise control 54 (FIG. 4) is engaged. When control determines that the cruise control 54 is not engaged, control can end. When control determines that the cruise control 54 is engaged, control can continue with step 456. In step 456, control can determine whether the front windshield wipers 50 (FIG. 4) are active. When control determines that the front windshield wipers 50 are not active, control can end. When control determines that the front windshield wipers 50 are active, control can continue in step 458.

In step 458, control can determine whether the ambient temperature is in greater than 45° F. (7.2° C.). Control can determine the ambient temperature by, for example, receiving information from the ambient temperature sensor 42 from the engine module 18. When control determines that the ambient temperature is not greater than 45° F., control can end. When control determines that the ambient temperature is greater than 45° F., control can continue in step 460.

In step 460, control can synchronize rotational velocities of the one or more components of the powertrain 200, 250, 300, 350. In step 462, control can engage the wheel end disconnects 74, 74a, 74b, 74c, 74d that can couple the front drivetrain 206, 256, 306, 356 to the front wheels 202, 252, 310, 360, respectively, and/or can couple the rear drivetrain 208, 258, 308, 358 to the rear wheels 210, 260, 302, 352, respectively. In step 464, control can couple the components of the powertrain 200, 250, 300, 350 that were uncoupled to provide the four wheel or all wheel condition and thus restore all of the powertrain components to the active condition. From step 464, control can end.

In a further aspect of the present teachings and with reference to FIG. 5, 8-11 and 14, the traction control system 10 can determine when to switch one or more components of the powertrain 200, 250, 300, 350 between the inactive and the active conditions. In one example, control can monitor the vehicle system bus, as illustrated in step 500. In step 502, control can determine whether the vehicle 30, 30a, 30b, 30c, 30d is in the two wheel drive condition, i.e., one or more components of the powertrain 200, 250, 300, 350 are in the inactive condition. When control determines that the vehicle 30, 30a, 30b, 30c, 30d is in the two wheel drive condition control can end. When control determines that the vehicle 30, 30a, 30b, 30c, 30d is not in the two wheel drive condition, control can continue in step 504.

In step 504, control can determine whether the cruise control 54 (FIG. 4) is engaged. When control determines that the cruise control 54 is not engaged, control can end. When control determines that the cruise control is engaged, control can continue in step 506. In step 506, control can determine whether the front windshield wipers 50 (FIG. 4) are inactive. When control determines that the front windshield wipers 50 are not inactive (i.e., the front windshield wipers 50 are on) control can end. When control determines that the front windshield wipers 50 are inactive (i.e., front windshield wipers 50 are turned off), control can continue in step 508. In step 508, control can determine whether the ambient temperature is greater than 50° F. (10° C.). When control determines that the ambient temperature is not greater than 50° F., control can end. When control determines that the ambient temperature is greater than 50° F., control can continue in step 510.

In step 510, control can determine whether road conditions indicate that the vehicle 30, 30a, 30b, 30c, 30d is driving on an improved road, e.g. an interstate highway. Control can determine that the vehicle 30, 30a, 30b, 30c, 30d is driving on the improved road by referencing road condition and/or geodetic information from the global positioning system 110 (FIG. 7) that can further include current map and/or construction information. When control determines that the vehicle 30, 30a, 30b, 30c, 30d is not driving on an improved road, control can end. When control determines that the vehicle 30, 30a, 30b, 30c, 30d is driving on an improved road, control can continue in step 512.

In step 512, control can disengage the wheel end disconnects 74, 74a, 74b, 74c, 74d that can uncouple the front drivetrain 206, 256, 306, 356 from the front wheels 202, 252, 310, 360, respectively, and/or can uncouple the rear drivetrain 208, 258, 308, 358 from the rear wheels 210, 260, 302, 352, respectively. In step 514, control can uncouple the components of the powertrain 200, 250, 300, 350 to provide the two wheel drive condition and thus place one or more components of the powertrain 200, 250, 300, 350 in an inactive condition. From step 514, control can end.

In yet another aspect of the present teachings and with reference to FIGS. 5, 8-11 and 15, the traction control system 10 can determine when to switch one or more components of the powertrain 200, 250, 300, 350 between the inactive and the active condition. In one example, control can monitor the vehicle system bus 12, as illustrated in step 550. In step 552, control can determine whether the vehicle 30, 30a, 30b, 30c, 30d is in the two wheel drive condition, i.e., the one or more components of the powertrain 200, 250, 300, 350 are in the inactive condition. When control determines that the vehicle 30, 30a, 30b, 30c, 30d is in the two wheel drive condition control can end. When control determines that the vehicle 30, 30a, 30b, 30c, 30d is not in the two wheel drive condition, control can continue in step 554.

In step 554, control can determine whether the vehicle 30, 30a, 30b, 30c, 30d is encountering precipitation. When control determines that the vehicle 30, 30a, 30b, 30c, 30d is not encountering precipitation, control can end. When control determines that the vehicle 30, 30a, 30b, 30c, 30d is encountering precipitation, control can continue in step 556. In step 556, control can synchronize rotational velocities of the one or more components of the powertrain 200, 250, 300, 350. In step 558, control can engage the wheel end disconnects 74, 74a, 74b, 74c, 74d that can couple the front drivetrain 206, 256, 306, 356 to the front wheels 202, 252, 310, 360, respectively, and/or can couple the rear drivetrain 208, 258, 308, 358 to the rear wheels 210, 260, 302, 352, respectively. In step 558, control can couple the components of the powertrain 200, 250, 300, 350 to provide the four wheel or all wheel condition and thus restore all of the powertrain components to the active condition. From step 558, control can end.

In another aspect of the present teachings and with reference to FIGS. 5, 8-11 and 16, the traction control system 10 can determine when to switch components of the powertrain 200, 250, 300, 350 between the active condition and the inactive condition. In one example, control can monitor the vehicle system bus, as illustrated in step 600. In step 602, control can determine whether the vehicle 30, 30a, 30b, 30c, 30d is in the two wheel drive condition, i.e., one or more components of the powertrain 200, 250, 300, 350 are in the inactive condition. When control determines that the vehicle 30, 30a, 30b, 30c, 30d is in the two wheel drive condition control can end. When control determines that the vehicle 30, 30a, 30b, 30c, 30d is not in the two wheel drive condition, control can continue in step 604.

In step 604, control can determine whether the vehicle 30, 30a, 30b, 30c, 30d is about to encounter an unimproved road, e.g., a dirt road or a seasonal road. When control determines that the vehicle 30, 30a, 30b, 30c, 30d is not about to encounter an unimproved road, control can end. When control determines that the vehicle 30, 30a, 30b, 30c, 30d is about to encounter an unimproved road, control can continue in step 606.

In step 606, control can determine whether the vehicle 30, 30a, 30b, 30c, 30d is about to encounter bad weather. Control can determine that the vehicle 30, 30a, 30b, 30c, 30d is about to encounter bad weather by, for example, correlating a position of the vehicle 30, 30a, 30b, 30c, 30d obtained from the global positioning system 110 (FIG. 7) with weather information from the entertainment and weather system 114 (FIG. 7). When the control determines that the vehicle 30, 30a, 30b, 30c, 30d is not about to encounter bad weather, control can end. When the control determines that the vehicle 30, 30a, 30b, 30c, 30d is about to encounter bad weather, control can continue in step 608.

In step 608, control can synchronize rotational velocities of the one or more components of the powertrain 200, 250, 300, 350. In step 610, control can engage the wheel end disconnects 74, 74a, 74b, 74c, 74d that can couple the front drivetrain 206, 256, 306, 356 to the front wheels 202, 252, 310, 360, respectively, and/or can couple the rear drivetrain 208, 258, 308, 358 to the rear wheels 210, 260, 302, 352, respectively. In step 612, control can couple the components of the powertrain 200, 250, 300, 350 to provide the four wheel or the all wheel condition and thus restore all of the powertrain components to the active condition. From step 612, control can end.

While specific aspects have been described in the specification and illustrated in the drawings, it will be understood by those skilled in the art that various changes can be made and equivalence can be substituted for elements thereof without departing from the scope of the present teachings, as defined in the claims. Furthermore, the mixing and matching of features, elements and/or functions between various aspects of the present teachings is expressly contemplated herein so that one skilled in the art will appreciate from the present teachings that features, elements, components, modules and/or functions of one aspect of the present teachings can be incorporated into another aspect as appropriate unless described otherwise above. Moreover, many modifications can be made to adapt a particular situation, configuration or material to the present teachings without departing from the essential scope thereof. Therefore, it can be intended that the present teachings not be limited to the particular aspects illustrated by the drawings and described in the specification as the best mode presently contemplated for carrying out the present teachings but that the scope of the present teachings will include many aspects and examples following within the foregoing description and the appended claims.

What is claimed is:

1. A method for controlling a powertrain that directs power from an engine and a transmission to all four wheels or to just front wheels or to just rear wheels, the method comprising:
    monitoring information transmitted over a communications network;
    determining whether one or more components of the powertrain are in an active condition or in an inactive condition, wherein said one or more components of the powertrain are in said inactive condition when said one or more components are not connected to the transmission and are not connected to the front wheels or the rear wheels and wherein said one or more components of the powertrain are in said active condition when said one or more components are connected to the transmission and are connected to the front wheels or the rear wheels; and
    switching said one or more components of the powertrain between said inactive condition and said active condition based only on said information from said communications network and without intervention from a user.

2. The method of claim 1 wherein said information is selected from a group consisting of ambient air temperature, ambient humidity, daytime, nighttime, and precipitation.

3. The method of claim 1 wherein said information includes a road condition that is determined from information received from at least one of a global positioning system and a satellite weather system.

4. The method of claim 1 wherein said information includes at least one of a type of a road on which the vehicle is traveling, a weather condition experienced by the vehicle, a weather condition about to be experienced by the vehicle, an altitude change along the road, and a course change different from the road.

5. The method of claim 1 wherein said information includes a road condition that is determined from information received from a vehicle system, wherein said vehicle system is selected from a group consisting of an acceleration rate sensor, a pitch sensor, a roll sensor, a yaw sensor, and a suspension sensor.

6. The method of claim 1 wherein said information includes a change in a vehicle system and wherein said vehicle system is selected from a group consisting of a front window defroster, a rear window defroster, a washer nozzle warmer, a cruise control, a rain sensor, a daylight sensor, a nighttime sensor, a heated seat, a sun roof, a front windshield wiper, a rear windshield wiper, and a fog light.

7. The method of claim 1 wherein switching said one or more components of said powertrain to said inactive condition includes uncoupling a differential, a driveshaft and two half shafts from the transmission and the front wheels or the rear wheels.

8. The method of claim 1 wherein switching said one or more components of said powertrain to said active condition includes coupling a differential, a driveshaft and two half shafts to the engine and the front wheels or the rear wheels after generally synchronizing the rotational velocity of said driveshaft and said half shafts with the transmission.

9. A traction control system for a vehicle having a powertrain that constantly delivers power to front wheels and selectively delivers power to rear wheels, the traction control system comprising:
   an engine that drives a transmission, said transmission provides an output torque;
   a front drivetrain that delivers said output torque to the front wheels;
   a power take off unit that receives said output torque from said transmission;
   a rear drivetrain that receives said output torque from said power takeoff unit and delivers said output torque to the rear wheels, said rear drivetrain operable in an active condition and in an inactive condition, wherein said rear drivetrain in said inactive condition is uncoupled from the rear wheels and said power takeoff unit; and
   a control module that selects between said inactive condition and said active condition based on at least one of a value descriptive of an ambient condition, a road condition, and a change in a vehicle system.

10. The traction control system of claim 9 further comprising a pair of wheel end disconnects that couple the rear wheels to said rear drivetrain in said active condition or uncouple the rear wheels from said rear drivetrain in said inactive condition.

11. The traction control system of claim 9 further comprising a coupling and a driveshaft, said coupling couples said power takeoff unit to said rear drivetrain in said active condition and uncouples said power takeoff unit from said rear drivetrain in said inactive condition, wherein said coupling is disposed between said power takeoff unit and said driveshaft or disposed between said driveshaft and said rear drivetrain.

12. The traction control system of claim 9 wherein said ambient condition is selected from a group consisting of ambient air temperature, ambient humidity, daytime, nighttime, and precipitation.

13. The traction control system of claim 9 wherein said road condition is determined from information received from at least one of a global positioning system and a satellite weather system.

14. The traction control system of claim 9 wherein said road condition includes one of a type of a road on which the vehicle is traveling, a weather condition experienced by the vehicle, an altitude change along the road, and a course change different from the road.

15. The traction control system of claim 9 wherein said road condition is determined from information received from a vehicle system, wherein said vehicle system is selected from a group consisting of an acceleration rate sensor, a pitch sensor, a roll sensor, a yaw sensor, and a suspension sensor.

16. The traction control system of claim 9 wherein said vehicle system is selected from a group consisting of a front window defroster, a rear window defroster, a washer nozzle warmer, a cruise control, a rain sensor, a daylight sensor, a nighttime sensor, a heated seat, a sun roof, a front windshield wiper, a rear windshield wiper, and a fog light.

17. The traction control system of claim 9 wherein said vehicle system is selected from a group consisting of a mass airflow sensor, engine coolant temperature sensor, and a cylinder head temperature.

18. A vehicle having a traction control system that controls a powertrain that constantly delivers power to front wheels and selectively delivers power to rear wheels or that constantly delivers power to rear wheels and selectively delivers power to front wheels, the vehicle comprising:
   an engine that drives a transmission, said transmission provides an output torque;
   a front drivetrain that delivers said output torque to the front wheels;
   a rear drivetrain that delivers said output torque to the rear wheels;
   a transfer case coupled to a front driveshaft and a rear driveshaft, said transfer case directs said torque output to said rear drivetrain via said rear driveshaft and directs said torque output to said front drivetrain via said front driveshaft;
   said front drivetrain or said rear drivetrain operable in an active condition and an inactive condition, wherein one or more components in said front drivetrain in said inactive condition is uncoupled from said transmission and the front wheels and wherein one or more components of said rear drivetrain in said inactive condition is uncoupled from said transmission and the rear wheels;
   a control module that switches said one or more components of said front drivetrain or said one or more components of said rear drivetrain between said inactive condition and said active condition based on a value descriptive of a condition that is external to the vehicle and without intervention from a user.

19. The vehicle of claim 18 wherein said condition that is external to the vehicle includes at least one of an ambient condition, a road condition, and a change in a vehicle system because of said condition that is external to the vehicle.

20. The vehicle of claim 18 further comprising wheel end disconnects that couple the front wheels to said front drivetrain or couple the rear wheels to said rear drivetrain in said active condition or uncouple the front wheels from said front drivetrain or uncouple the rear wheels from said rear drivetrain in said inactive condition.

* * * * *

UNITED STATES PATENT AND TRADEMARK OFFICE
CERTIFICATE OF CORRECTION

PATENT NO.        : 8,165,767 B2                                    Page 1 of 1
APPLICATION NO.   : 12/439002
DATED             : April 24, 2012
INVENTOR(S)       : Zalewski et al.

It is certified that error appears in the above-identified patent and that said Letters Patent is hereby corrected as shown below:

Title page, add Related U.S. Application Data section as follows:

Related U.S. Application Data
(60)    Provisional application No. 60/841,679, filed on Aug. 31, 2006.

Signed and Sealed this
Fourteenth Day of August, 2012

David J. Kappos
*Director of the United States Patent and Trademark Office*